United States Patent
Gao et al.

(10) Patent No.: US 12,177,013 B2
(45) Date of Patent: Dec. 24, 2024

(54) SHORT-DISTANCE COMMUNICATION METHOD, APPARATUS, AND SYSTEM

(71) Applicant: Huawei Technologies Co., Ltd., Shenzhen (CN)

(72) Inventors: Lei Gao, Beijing (CN); Xingqing Cheng, Shenzhen (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/164,322

(22) Filed: Feb. 3, 2023

(65) Prior Publication Data

US 2023/0179329 A1  Jun. 8, 2023

Related U.S. Application Data

(63) Continuation of application No. PCT/CN2021/076947, filed on Feb. 19, 2021.

(30) Foreign Application Priority Data

Aug. 3, 2020 (WO) ................ PCT/CN2020/106669

(51) Int. Cl.
*H04L 1/00* (2006.01)
*H04L 1/1607* (2023.01)

(52) U.S. Cl.
CPC .......... *H04L 1/0058* (2013.01); *H04L 1/1614* (2013.01)

(58) Field of Classification Search
CPC .... H04L 1/0058; H04L 1/1614; H04L 1/1896

USPC .......................................................... 714/699
See application file for complete search history.

(56) References Cited

U.S. PATENT DOCUMENTS

| | | | |
|---|---|---|---|
| 10,615,922 B2 | 4/2020 | Yeo et al. | |
| 2011/0317637 A1 | 12/2011 | Kim et al. | |
| 2016/0128032 A1 | 5/2016 | Wang et al. | |
| 2016/0226643 A1 | 8/2016 | Mallik et al. | |
| 2016/0323854 A1 | 11/2016 | Gao et al. | |
| 2018/0034596 A1* | 2/2018 | Noh ...................... | H04L 1/1845 |

(Continued)

FOREIGN PATENT DOCUMENTS

| | | |
|---|---|---|
| CN | 104734821 A | 6/2015 |
| CN | 108400857 A | 8/2018 |

(Continued)

OTHER PUBLICATIONS

R1-1712691, Lenovo et al: "DL control signalling for retransmitted CBG indication," 3GPP TSG RAN WG 1 Meeting #90, Prague, P.R. Czech, Aug. 21-25, 2017, XP051315504, 4 pages.

(Continued)

*Primary Examiner* — James C Kerveros
(74) *Attorney, Agent, or Firm* — Conley Rose, P.C.

(57) ABSTRACT

A short-distance communication method includes: obtaining at least one piece of code data; sending a scheduling type indication and a data type indication to a second device, where the scheduling type indication indicates that the at least one piece of code data includes initially transmitted data, retransmitted data, or initially transmitted data and retransmitted data, and the data type indication indicates location information and/or an amount of a part or all of the at least one piece of code data; and sending the at least one piece of code data to the second device.

20 Claims, 5 Drawing Sheets

(56) References Cited

U.S. PATENT DOCUMENTS

| | | | |
|---|---|---|---|
| 2018/0278379 A1* | 9/2018 | Sun | H04L 1/1861 |
| 2018/0368113 A1* | 12/2018 | Gupta | H04L 1/0061 |
| 2019/0007170 A1* | 1/2019 | Sun | H04L 1/0072 |
| 2019/0053201 A1* | 2/2019 | Nammi | H04W 72/23 |
| 2019/0053254 A1* | 2/2019 | Zhang | H04W 72/23 |
| 2019/0273582 A1 | 9/2019 | Yeo et al. | |
| 2019/0334656 A1 | 10/2019 | Ma et al. | |
| 2020/0052825 A1* | 2/2020 | Sarkis | H04W 72/121 |
| 2020/0084761 A1* | 3/2020 | Baldemair | H04L 5/0057 |
| 2020/0106566 A1* | 4/2020 | Yeo | H04W 28/04 |
| 2020/0220663 A1 | 7/2020 | Tsai | |
| 2021/0160010 A1 | 5/2021 | Lin | |
| 2021/0211232 A1 | 7/2021 | Hwang et al. | |
| 2021/0242980 A1* | 8/2021 | Zhang | H04L 1/1887 |
| 2022/0278774 A1 | 9/2022 | Zhu et al. | |

FOREIGN PATENT DOCUMENTS

| | | |
|---|---|---|
| CN | 109120380 A | 1/2019 |
| CN | 109152071 A | 1/2019 |
| CN | 109565866 A | 4/2019 |
| CN | 110603764 A | 12/2019 |
| CN | 110574321 B | 12/2022 |
| JP | 2012109841 A | 6/2012 |
| JP | 2018507636 A | 3/2018 |
| JP | 2019537313 A | 12/2019 |
| JP | 2020507238 A | 3/2020 |
| WO | 2018127093 A1 | 7/2018 |

OTHER PUBLICATIONS

R1-1717499, Vivo "Support of CBG-based (re)transmission," 3GPP TSG RAN WG1 Meeting 90bis, Prague, CZ, Oct. 9-13, 2017, Oct. 9-13, 2017, 5 pages.

R1-1906993, Qualcomm Incorporated "Scheduling of multiple DL/UL transport blocks," 3GPP TSG RAN WG1 Meeting #97, Reno, USA, May 13-17, 2019, 12 pages.

Catt "DL control signaling design for CBG-based operation," R1-1712416, 3GPP TSG RAN WG1 Meeting #90, Prague, Czechia, Aug. 21-25, 2017, 4 pages.

Ericsson "Feature lead summary#1 on Resource allocation for NR sidelink Mode 1" 3GPP TSG-RAN WGI Meeting #98bis, R1-1910553, Oct. 14-20, 2019, 5 pages.

* cited by examiner

| | CBG 0 | CBG 1 | CBG 2 | CBG 3 | CBG 4 | CBG 5 | CBG 6 | CBG 7 |
|---|---|---|---|---|---|---|---|---|
| Bitmap | 1 | 1 | 1 | 1 | 0 | 0 | 0 | 0 |

FIG. 4A

| | CBG 0 | CBG 1 | CBG 2 | CBG 3 | CBG 4 | CBG 5 | CBG 6 | CBG 7 |
|---|---|---|---|---|---|---|---|---|
| Bitmap | 0 | 1 | 0 | 0 | 0 | 0 | 0 | 0 |

FIG. 4B

| | CBG 0 | CBG 1 | CBG 2 | CBG 3 | CBG 4 | CBG 5 | CBG 6 | CBG 7 |
|---|---|---|---|---|---|---|---|---|
| Bitmap | 1 | 1 | 1 | 0 | 0 | 0 | 0 | 0 |

FIG. 5

| | CBG 0 | CBG 1 | CBG 2 | CBG 3 | CBG 4 | CBG 5 | CBG 6 | CBG 7 |
|---|---|---|---|---|---|---|---|---|
| Bitmap | 1 | 1 | 1 | 1 | 1 | 0 | 0 | 0 |

FIG. 6

| | CBG 0 | CBG 1 | CBG 2 | CBG 3 | CBG 4 | CBG 5 | CBG 6 | CBG 7 |
|---|---|---|---|---|---|---|---|---|
| Bitmap | 0 | 1 | 0 | 0 | 0 | 0 | 0 | 0 |

FIG. 7

| | CBG 0 | CBG 1 | CBG 2 | CBG 3 | CBG 4 | CBG 5 | CBG 6 | CBG 7 |
|---|---|---|---|---|---|---|---|---|
| Bitmap | 0 | 1 | 1 | 1 | 1 | 1 | 1 | 1 |

FIG. 8

SHORT-DISTANCE COMMUNICATION METHOD, APPARATUS, AND SYSTEM

CROSS-REFERENCE TO RELATED APPLICATIONS

This is a continuation of International Patent Application No. PCT/CN2021/076947 filed on Feb. 19, 2021, which claims priority to International Patent Application No. PCT/CN2020/106669 filed on Aug. 3, 2020. The disclosures of the aforementioned applications are hereby incorporated by reference in their entireties.

TECHNICAL FIELD

This application relates to the field of communication technologies, and in particular, to a short-distance communication method, an apparatus, and a system.

BACKGROUND

In a communication system, one piece of downlink control information (DCI) may be usually used to schedule one or more transport blocks (TBs). Generally, due to limitation of length of channel coding, one transport block is divided into a plurality of code blocks or code block groups, and one code block group includes one or more code blocks. A transmit end sends a transport block to a receive end; the receive end feeds back, based on a receiving status, whether code blocks or code block groups are correctly received; and the transmit end determines, based on a feedback status of the receive end, whether to subsequently send a new transport block or retransmit a code block or code block group in which an error occurs.

In the conventional technology, it is specified that data sent by a transmit end each time is either a new transport block or a code block or code block group in which a transmission error occurs.

In short-distance communication, a system has a large available bandwidth, for example, a bandwidth of 20 megahertz (MHz) or 80 MHz, but supports a small quantity of users. As a result, a transport block is large for a user. During transmission, a transmission error may occur only on an individual code block or code block group; and during retransmission, only the code block or code block group in which the transmission error occurs is sent, which results in serious resource waste.

SUMMARY

This application provides a short-distance communication method, an apparatus, and a system, to reduce resource waste.

According to a first aspect, an embodiment of this application provides a short-distance communication method. The method may be performed by a first device, or may be performed by a component (for example, a processor, a chip, or a chip system) in the first device, and includes: obtaining at least one piece of code data; sending a scheduling type indication and a data type indication to a second device, where the scheduling type indication is used to indicate that the at least one piece of code data includes initially transmitted data, retransmitted data, or initially transmitted data and retransmitted data; and the data type indication is used to indicate location information and/or an amount of a part or all of the at least one piece of code data; and sending the at least one piece of code data to the second device.

In this solution, when sending the code data to the second device, the first device can choose to send only the initially transmitted data, the retransmitted data, or the initially transmitted data and the retransmitted data based on the to-be-sent code data and a currently available physical resource. This can maximize utilization of the available physical resource, improve physical resource utilization, and reduce resource waste.

In a possible implementation method, the at least one piece of code data includes at least one code block group, and the data type indication is used to indicate location information and/or a quantity of a part or all of the at least one code block group.

In this solution, the code data is transmitted at a granularity of a code block group, and this can improve data transmission efficiency.

In a possible implementation method, the at least one piece of code data includes at least one piece of transport block data and at least one piece of code block data, the at least one piece of transport block data is initially transmitted data, the at least one piece of code block data is retransmitted data, and the scheduling type indication is used to indicate that the at least one piece of code data includes the initially transmitted data and the retransmitted data.

The at least one piece of transport block data includes one or more initially transmitted code blocks, or one or more initially transmitted code block groups. The at least one piece of code block data includes one or more retransmitted code blocks, or one or more retransmitted code block groups.

In this solution, during hybrid transmission, the at least one piece of transport block data and the at least one piece of code block data can be simultaneously transmitted, and this improves resource utilization and reduces resource waste.

In a possible implementation method, the data type indication is a bitmap, the bitmap includes N bits, N is preconfigured or predefined, or is notified by using signaling, N is used to indicate a maximum quantity of code block groups included in a transport block, N is an integer greater than 1, and the bitmap is used to indicate location information and/or an amount of the at least one piece of code data.

In this solution, the data type indication is implemented as a bitmap, and the implementation is simple and flexible.

In a possible implementation method, the data type indication is a bitmap, the bitmap includes N bits, N is preconfigured or predefined, or is notified by using signaling, N is used to indicate a maximum quantity of code block groups included in a transport block, N is an integer greater than 1, and the bitmap is used to indicate location information and/or an amount of the at least one piece of code block data.

In this solution, the data type indication is implemented as a bitmap, and the implementation is simple and flexible.

In a possible implementation method, the method further includes: sending indication information to the second device, where the indication information is used to indicate location information and/or an amount of the at least one piece of transport block data, and the amount of the at least one piece of transport block data is a quantity of code block groups in the at least one piece of transport block data.

In this solution, the indication information indicates an amount of initially transmitted data, so that the second device can accurately determine the amount of the initially transmitted data, and the second device can accurately determine a type of the code data.

In a possible implementation method, a quantity, location information, and sizes of code block groups included in the at least one piece of code block data are correspondingly the same as a quantity, location information, and sizes of code block groups included in the at least one piece of code block data during initial transmission.

In this solution, during two times of transmission, the quantity, the location information, and the sizes of the code block groups included in retransmitted data are correspondingly the same as those of the code block groups included in the retransmitted data during initial transmission. This ensures correct sending of the retransmitted data, and the implementation is simple.

In a possible implementation method, location information and a size of a code block group included in the at least one piece of transport block data are the same as location information and a size of a code block group included in code data that is successfully transmitted in code data transmitted last time; or location information and a size of a code block group included in the at least one piece of transport block data are the same as location information and a size of a code block group included in a part of code data that is successfully transmitted last time.

In this solution, the location information and the size of the code block group included in initially transmitted data are the same as those of the code block group included in the code data that is successfully transmitted in the code data transmitted last time or those of the code block group included in the part of code data in the code data that is successfully transmitted last time. The implementation is simple, and improves transmission performance.

In a possible implementation method, the method further includes: determining, based on a physical resource used for the at least one piece of code data and a modulation and coding scheme, sizes and a quantity of code block groups included in the at least one piece of transport block data.

In a possible implementation method, the at least one piece of code data includes at least one piece of transport block data, the at least one piece of transport block data is initially transmitted data, and the scheduling type indication is used to indicate that the at least one piece of code data includes the initially transmitted data; or the at least one piece of code data includes at least one piece of code block data, the at least one piece of code block data is retransmitted data, and the scheduling type indication is used to indicate that the at least one piece of code data includes the retransmitted data.

In a possible implementation method, the sending the at least one piece of code data to the second device includes: mapping the at least one piece of code data to a first physical resource, and sending the at least one piece of code data to the second device, where a mapping manner in which a code block or a code block group included in the at least one piece of code data is mapped to the first physical resource meets a predefined transport block mapping rule.

In a possible implementation method, the scheduling type indication includes L bits, and L is a positive integer; and some bit statuses of the L bits are used to indicate at least one of redundancy version information and a coding mode of a channel bit sequence. Specifically, L may be 3. This setting can provide sufficient indication information with low signaling costs.

Further, there are at least three coding modes: a coding mode 1, a coding mode 2, and a coding mode 3, and different coding modes correspond to different manners for generating a channel bit sequence. Herein, it means that on the whole, different coding modes correspond to different manners for generating a channel bit sequence, and it is not excluded a case in which different coding modes may correspond to a same manner for generating a channel bit sequence in a specific scenario or under a specific condition. Specifically, the coding mode may be understood as a manner for extracting a channel bit sequence from an encoded bit sequence.

In a design, the redundancy version information includes a redundancy version number, and a bit status of the L bits included in the scheduling type indication is used to indicate at least one of the following: transport block-based initial transmission; transport block-based retransmission, and determining a channel bit sequence corresponding to a redundancy version 1 by using the coding mode 1 or the coding mode 2; transport block-based retransmission, and determining a channel bit sequence corresponding to a redundancy version 1 by using the coding mode 3; code block group-based retransmission, and determining a channel bit sequence corresponding to a redundancy version 1 by using the coding mode 3; code block group-based retransmission, and determining a channel bit sequence corresponding to a redundancy version 1 by using the coding mode 1 or the coding mode 2; code block group-based retransmission, and a redundancy version 2; code block group-based retransmission, and a redundancy version 3; and code block group-based hybrid transmission of initial transmission and retransmission, and determining a channel bit sequence corresponding to a redundancy version 1 by using the coding mode 3.

According to a second aspect, an embodiment of this application provides a short-distance communication method. The method may be performed by a second device, or may be performed by a component (for example, a processor, a chip, or a chip system) in the second device, and includes: receiving at least one piece of code data from a first device; receiving a scheduling type indication and a data type indication from the first device, where the scheduling type indication is used to indicate that the at least one piece of code data includes initially transmitted data, retransmitted data, or initially transmitted data and retransmitted data; and the data type indication is used to indicate location information and/or an amount of a part or all of the at least one piece of code data; and obtaining the at least one piece of code data based on the scheduling type indication and the data type indication.

In the foregoing solution, the code data received from the first device is determined based on a currently available physical resource. Specifically, the code data received from the first device includes only the initially transmitted data, or only the retransmitted data, or the initially transmitted data and the retransmitted data. This can maximize utilization of the available physical resource, improve physical resource utilization, and reduce resource waste.

In a possible implementation method, the at least one piece of code data includes at least one code block group, and the data type indication is used to indicate location information and/or a quantity of a part or all of the at least one code block group.

In this solution, the code data is transmitted at a granularity of a code block group, and this can improve data transmission efficiency.

In a possible implementation method, the at least one piece of code data includes at least one piece of transport block data and at least one piece of code block data, the at least one piece of transport block data is initially transmitted data, the at least one piece of code block data is retransmitted data, and the scheduling type indication is used to indicate that the at least one piece of code data includes the initially transmitted data and the retransmitted data. Obtaining the at least one piece of code data based on the scheduling type indication and the data type indication specifically includes: obtaining the at least one piece of transport block data and the at least one piece of code block data respectively based on the scheduling type indication and the data type indication.

In this solution, during hybrid transmission, the at least one piece of transport block data and the at least one piece of code block data can be simultaneously transmitted, and this improves resource utilization and reduces resource waste.

In a possible implementation method, the data type indication is a bitmap, the bitmap includes N bits, N is preconfigured or predefined, or is notified by using signaling, N is used to indicate a maximum quantity of code block groups included in a transport block, N is an integer greater than 1, and the bitmap is used to indicate location information and/or an amount of the at least one piece of code data.

In this solution, the data type indication is implemented as a bitmap, and the implementation is simple and flexible.

In a possible implementation method, the data type indication is a bitmap, the bitmap includes N bits, N is preconfigured or predefined, or is notified by using signaling, N is used to indicate a maximum quantity of code block groups included in a transport block, N is an integer greater than 1, and the bitmap is used to indicate location information and/or an amount of the at least one piece of code block data.

In this solution, the data type indication is implemented as a bitmap, and the implementation is simple and flexible.

In a possible implementation method, the method further includes: receiving indication information from the first device, where the indication information is used to indicate location information and/or an amount of the at least one piece of transport block data, and the amount of the at least one piece of transport block data is a quantity of code block groups in the at least one piece of transport block data. The obtaining the at least one piece of transport block data and the at least one piece of code block data respectively based on the scheduling type indication and the data type indication includes: separately obtaining the at least one piece of transport block data and the at least one piece of code block data based on the scheduling type indication, the data type indication, and the indication information.

In a possible implementation method, a quantity, location information, and sizes of code block groups included in the at least one piece of code block data are correspondingly the same as a quantity, location information, and sizes of code block groups included in the at least one piece of code block data during initial transmission.

In this solution, during two times of transmission, the quantity, the location information, and the sizes of the code block groups included in retransmitted data are correspondingly the same as those of the code block groups included in the retransmitted data during initial transmission. This ensures correct sending of the retransmitted data, and the implementation is simple.

In a possible implementation method, location information and a size of a code block group included in the at least one piece of transport block data are the same as location information and a size of a code block group included in code data that is successfully transmitted in code data transmitted last time; or location information and a size of a code block group included in the at least one piece of transport block data are the same as location information and a size of a code block group included in a part of code data that is successfully transmitted last time.

In this solution, the location information and the size of the code block group included in initially transmitted data are the same as those of the code block group included in the code data that is successfully transmitted in the code data transmitted last time or those of the code block group included in the part of code data in the code data that is successfully transmitted last time. The implementation is simple, and improves transmission performance.

In a possible implementation method, the method further includes: determining, based on a physical resource used for the at least one piece of code data and a modulation and coding scheme, sizes and a quantity of code block groups included in the at least one piece of transport block data.

In a possible implementation method, the at least one piece of code data includes at least one piece of transport block data, the at least one piece of transport block data is initially transmitted data, and the scheduling type indication is used to indicate that the at least one piece of code data includes the initially transmitted data; or the at least one piece of code data includes at least one piece of code block data, the at least one piece of code block data is retransmitted data, and the scheduling type indication is used to indicate that the at least one piece of code data includes the retransmitted data.

In a possible implementation method, the receiving at least one piece of code data from a first device includes: receiving, from the first device, the at least one piece of code data that is mapped to a first physical resource, where a mapping manner in which a code block or a code block group included in the at least one piece of code data is mapped to the first physical resource meets a predefined transport block mapping rule.

According to a third aspect, an embodiment of this application provides a communication apparatus. The apparatus may be a first device, or may be a chip used in the first device. The apparatus has functions of implementing the method in the first aspect or the possible implementations of the first aspect. The functions may be implemented by hardware, or may be implemented by hardware executing corresponding software. The hardware or software includes one or more modules corresponding to the functions.

According to a fourth aspect, an embodiment of this application provides a communication apparatus. The apparatus may be a second device, or may be a chip used in the second device. The apparatus has functions of implementing the method in the second aspect or the possible implementations of the second aspect. The functions may be implemented by hardware, or may be implemented by hardware executing corresponding software. The hardware or software includes one or more modules corresponding to the functions.

According to a fifth aspect, an embodiment of this application provides a communication apparatus, including a processor. The processor is coupled to a memory, the memory is configured to store programs or instructions, and when the programs or the instructions are executed by the processor, the apparatus is enabled to implement the method in the first aspect, the second aspect, the possible implementations of the first aspect, or the possible implementations of the second aspect. The memory may be located inside or outside the apparatus. In addition, there are one or more processors.

According to a sixth aspect, an embodiment of this application provides a communication apparatus, including units or means configured to perform steps in the method of the first aspect, the second aspect, the possible implementations of the first aspect, or the possible implementations of the second aspect.

According to a seventh aspect, an embodiment of this application provides a communication apparatus, including at least one processor and an interface. The interface is configured to provide program instructions or data for the at least one processor, and the at least one processor is configured to execute the program instructions, to implement the method in the first aspect, the second aspect, the possible implementations of the first aspect, or the possible implementations of the second aspect.

According to an eighth aspect, an embodiment of this application further provides a computer-readable storage medium, including instructions. When the instructions are run on a computer, the computer is enabled to perform the method in the first aspect, the second aspect, the possible implementations of the first aspect, or the possible implementations of the second aspect.

According to a ninth aspect, an embodiment of this application further provides a computer program product. When the computer program product runs on a computer, the computer is enabled to perform the method in the first aspect, the second aspect, the possible implementations of the first aspect, or the possible implementations of the second aspect.

According to a tenth aspect, an embodiment of this application further provides a chip system, including a processor. The processor is coupled to a memory, the memory is configured to store programs or instructions, and when the programs or the instructions are executed by the processor, the chip system is enabled to implement the method in the first aspect, the second aspect, the possible implementations of the first aspect, or the possible implementations of the second aspect. The memory may be located inside or outside the chip system. In addition, there are one or more processors.

According to an eleventh aspect, an embodiment of this application further provides a communication system, including a first device configured to perform the method in any one of the first aspect or the possible implementations of the first aspect, and a second device configured to perform the method in any one of the second aspect or the possible implementations of the second aspect.

According to a twelfth aspect, an embodiment of this application further provides a terminal, including at least one processor and a memory. The memory is configured to store computer-executable instructions, and when the terminal runs, the at least one processor executes the computer-executable instructions stored in the memory, so that the terminal performs the method in the first aspect, the second aspect, the possible implementations of the first aspect, or the possible implementations of the second aspect.

BRIEF DESCRIPTION OF DRAWINGS

FIG. 4A is a schematic diagram of a bitmap according to an embodiment of this application;

FIG. 4B is a schematic diagram of another bitmap according to an embodiment of this application;

FIG. 5 is a schematic diagram of still another bitmap according to an embodiment of this application;

FIG. 6 is a schematic diagram of yet another bitmap according to an embodiment of this application;

FIG. 7 is a schematic diagram of still yet another bitmap according to an embodiment of this application;

FIG. 8 is a diagram of an example of feedback information;

DESCRIPTION OF EMBODIMENTS

Figure 1:
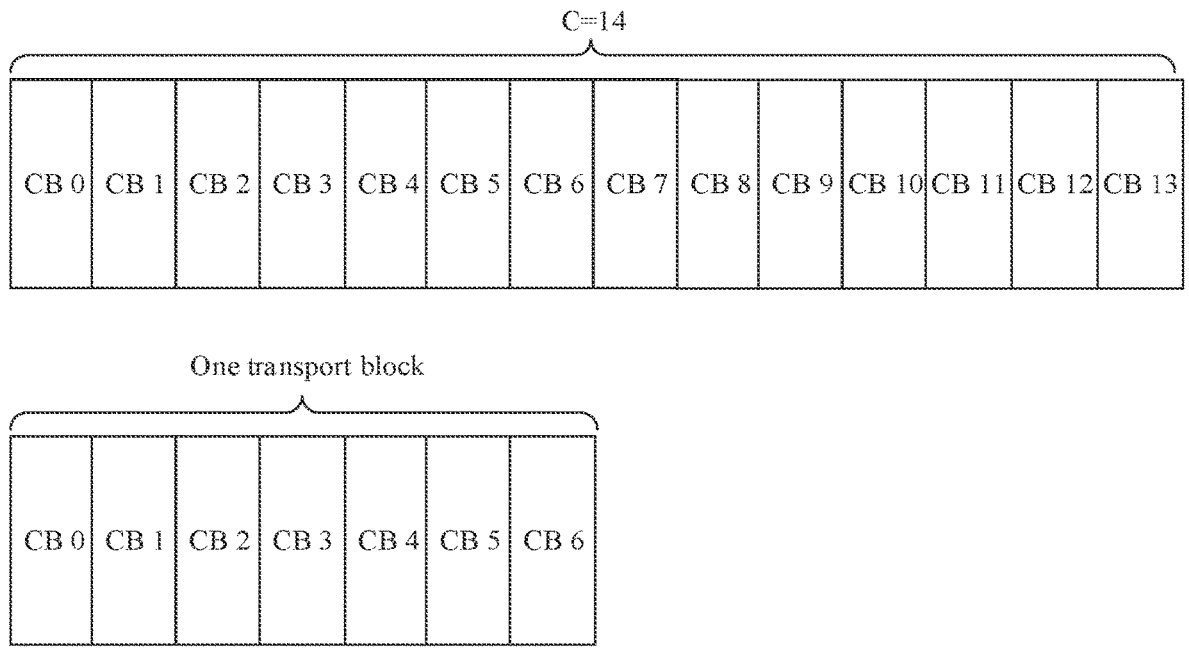
FIG. 1 is a schematic diagram of a relationship between a transport block and a code block.

To make the objectives, technical solutions, and advantages of this application clearer, the following further describes this application in detail with reference to the accompanying drawings. A specific operation method in a method embodiment may also be applied to an apparatus embodiment or a system embodiment. In the descriptions of this application, unless otherwise specified, "a plurality of" means two or more than two.

Embodiments of this application may be applied to a plurality of scenarios, for example, scenarios including intelligent terminals, such as smart home communication, intelligent transportation communication, robot communication, and unmanned aerial vehicle communication. In an example, embodiments of this application may be applied to a vehicle-mounted application scenario. Diversified vehicle-mounted applications lead to increasingly more in-vehicle communication nodes and more types of in-vehicle communication nodes, and impose a higher requirement on a vehicle-mounted communication capability. Compared with the conventional wired communication, in-vehicle wireless communication can further reduce a quantity, length, and weight of internal wiring harnesses of a vehicle, and corresponding installation and maintenance costs. Therefore, the in-vehicle communication technology is gradually becoming wireless. Usually, there are a plurality of communication domains in a vehicle. One communication domain includes one primary node and at least one secondary node. The primary node schedules the secondary node, so that the primary node and the secondary node transmit data to each other. A sending device (also referred to as a first device) in embodiments of this application may be a primary node in in-vehicle communication, and a receiving device (also referred to as a second device) may be a secondary node in in-vehicle communication; or the sending device is a secondary node in in-vehicle communication, and the receiving device is a primary node in in-vehicle communication.

In another example, embodiments of this application may be applied to a home scenario. The home scenario supports a small quantity of users, but has a wide available bandwidth, for example, 40 MHz or 80 MHz. If the bandwidth is all provided for one user, a transport block is quite large. To reduce a signal processing delay and improve resource utilization, a transport block is usually divided into a plurality of code blocks (CBs) or code block groups (CBGs), and then sent to a receiving device (also referred to as a second device) after steps such as channel coding. In a transmission process, due to impact of channel fading, interference, and the like, a transmission error occurs in an individual code block or code block group. The receiving device can feed back which code block or code block group has the transmission error. During next transmission, a sending device can send the code block or the code block group in which the transmission error occurs, and can simultaneously send some new code blocks or code block groups, thereby increasing a system capacity.

In still another example, embodiments of this application may be applied to air-interface communication. A sending device may be a terminal device, and a receiving device may be a base station; or a sending device is a base station, and a receiving device is a terminal device.

In an implementation method, in embodiments of this application, one transport block may be divided into a plurality of code blocks. A quantity (represented by C) of code blocks actually included in one transport block is not limited. For example, the quantity of code blocks actually included in the transport block may be determined according to a transport-block-to-code-block segmentation rule or in another manner. FIG. 1 is a schematic diagram of a relationship between a transport block and a code block. It can be seen from the upper part in FIG. 1 that C=14. It can be seen from the lower part in FIG. 1 that a transport block actually includes seven code blocks (a CB 0 to a CB 6).

In another implementation method, in embodiments of this application, one transport block may alternatively be divided into a plurality of code block groups, and each code block group includes one or more code blocks. A maximum quantity (represented by N) of code block groups included in one transport block may be configured by using higher layer signaling or physical layer signaling. In this way, a quantity (represented by M) of code block groups actually included in each transport block does not exceed N. A quantity (represented by C) of code blocks actually included in one transport block is not limited in embodiments of this application. For example, the quantity of code blocks actually included in the transport block may be determined according to a transport-block-to-code-block segmentation rule or in another manner. M=min(C, N) is met, that is, M is a smaller value of C and N. Optionally, it is defined that $$M_1 = \mathrm{mod}(C, M),$$
$$K_1 = \left\lceil \frac{C}{M} \right\rceil, \text{ and } K_2 = \left\lfloor \frac{C}{M} \right\rfloor.$$

Figure 2A:
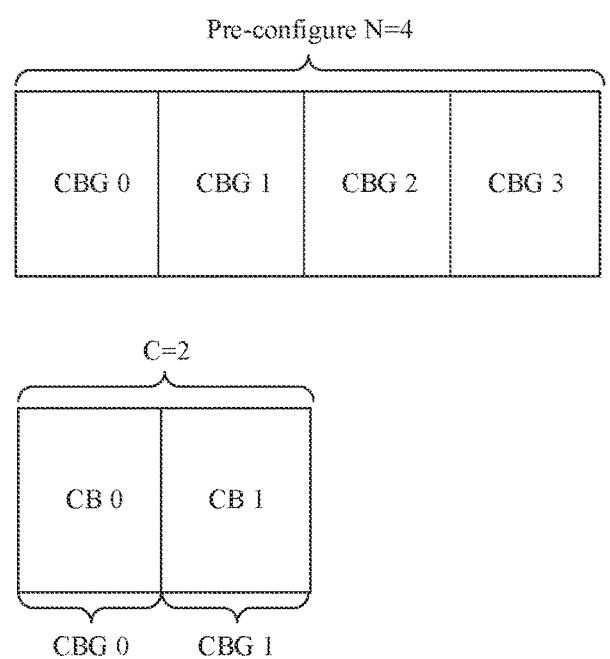
FIG. 2A is a schematic diagram of a relationship between a transport block and a code block group.
Figure 2B:
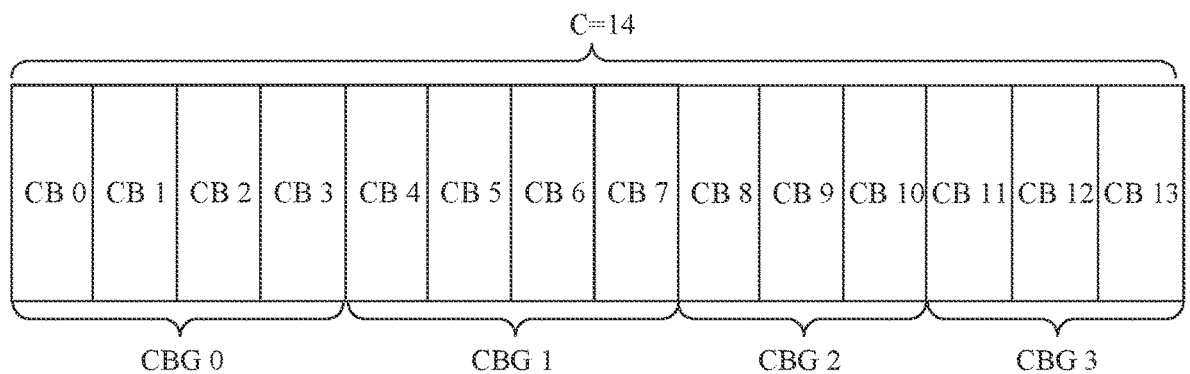
FIG. 2B is another schematic diagram of a relationship between a transport block and a code block group.

In one scenario, $M_1>0$, $K_1$ represents a quantity of code blocks included in each of code block groups 0 to $(M_1-1)$, $K_2$ represents a quantity of code blocks included in each of code block groups $M_1$ to $(M-1)$, mod represents a modulo operation, $\lceil \ \rceil$ represents rounding up, and $\lfloor \ \rfloor$ represents rounding down. In another scenario, $M_1=0$, and each code block group includes a same quantity of code blocks in this case. FIG. 2A is a schematic diagram of a relationship between a transport block and a code block group. This figure shows a case in which C is less than N. Assuming that C=2, the two code blocks are separately divided into two code block groups. Specifically, CBG 0={CB 0}, and CBG 1={CB 1}. That is, M=min(2, 4)=2. FIG. 2B is another schematic diagram of a relationship between a transport block and a code block group. This figure shows a case in which C is greater than N. Assuming that C=14, the 14 code blocks are divided into four code block groups. Specifically, CBG 0={CB 0, CB 1, CB 2, CB 3}, CBG 1={CB 4, CB 5, CB 6, CB 7}, CBG 2={CB 8, CB 9, CB 10}, CBG 3={CB 11, CB 12, CB 13}. That is, M=min(14, 4)=4.

Embodiments of this application are applicable to both a scenario in which a transport block is divided into one or more code blocks and a scenario in which a transport block is divided into one or more code block groups (one code block group includes one or more code blocks). In the scenario in which the transport block is divided into the one or more code blocks, the code block may be referred to as code data or code block data. In the scenario in which the transport block is divided into the one or more code block groups, the code block group may be referred to as code data or code block data. In other words, the code data or code block data in the following embodiments of this application may be the code block, or may be the code block group.

To resolve the technical problem mentioned in the background, embodiments of this application provide a short-distance communication method. In the method, each time code data is sent, only initially transmitted data (also referred to as newly transmitted data), retransmitted data, or initially transmitted data and retransmitted data can be sent. This can maximize utilization of a physical resource, and avoid resource waste due to low utilization of the physical resource.

Figure 3:
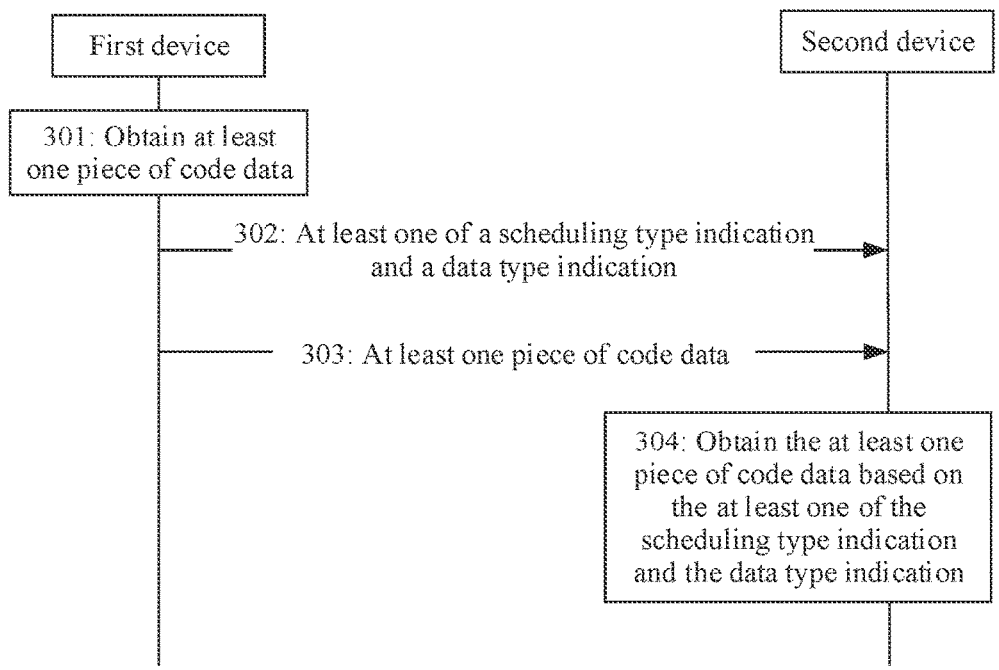
FIG. 3 is a schematic flowchart of a short-distance communication method according to an embodiment of this application.

FIG. 3 is a schematic flowchart of a short-distance communication method according to an embodiment of this application. On a transmit side, the method may be performed by a first device or a component (for example, a processor, a chip, or a chip system) in the first device. On a receive side, the method may be performed by a second device or a component (for example, a processor, a chip, or a chip system) in the second device. Descriptions are provided below by using an example in which the method is performed by the first device and the second device. The method includes the following steps.

Step 301: The first device obtains at least one piece of code data.

In a scenario in which a transport block is divided into one or more code blocks, that the first device obtains at least one piece of code data means that the first device obtains at least one code data block. In a scenario in which a transport block is divided into one or more code block groups, that the first device obtains at least one piece of code data means that the first device obtains at least one code data block group, where each code block group includes one or more code data blocks. It should be noted herein that a quantity of code block groups included in a transport block, a quantity of code blocks included in a transport block, and a quantity of code blocks included in a code block group are not specifically limited in this application. For details, refer to the foregoing descriptions or perform configuration or determining based on a specific communication scenario.

The at least one piece of code data herein is code data to be sent to the second device.

In a first case, the at least one piece of code data herein may include initially transmitted data and retransmitted data. For example, when a transmission error occurs in a part or all of code data transmitted last time, the first device may receive feedback information, to indicate the code data in which the transmission error occurs. Therefore, the code data in which the transmission error occurs can be retransmitted during next transmission. In addition, if there is still a new transport block that needs to be sent and there is a remaining physical resource available to send the new transport block, both initially transmitted data (namely, the new transport block) and retransmitted data (namely, the code data in which the transmission error occurs in the last time) can be sent during next transmission. Data transmission in the first case may also be referred to as hybrid transmission.

In a second case, the at least one piece of code data herein may include only initially transmitted data. For example, when code data is transmitted for the first time (that is, initially transmitted), the at least one piece of code data obtained by the first device is the initially transmitted data. For another example, when code data transmitted last time is correctly transmitted, retransmitted data is not included in next transmission. Therefore, the at least one piece of code data that is obtained by the first device and that is to be transmitted to the second device is also the initially transmitted data.

In a third case, the at least one piece of code data herein may include only retransmitted data. For example, when a transmission error occurs in a part or all of code data transmitted last time, the first device may receive feedback information, to indicate the code data in which the transmission error occurs, and in next transmission, the first device may retransmit the code data in which the transmission error occurs. In addition, no new transport block needs to be sent or no remaining physical resource is available for sending the new transport block. In this case, only the retransmitted data is sent in next transmission, that is, only the code data in which the transmission error occurs in the last time is sent.

In this embodiment of this application, a principle for sending the code data is as follows: A physical resource is used as much as possible, and as much code data as possible is sent in one transmission, to fully utilize the physical resource and reduce resource waste. Therefore, when the initially transmitted data and the retransmitted data can be simultaneously transmitted, hybrid transmission is used.

Step 302: The first device sends at least one of a scheduling type indication and a data type indication to the second device. Correspondingly, the second device receives the at least one of the scheduling type indication and the data type indication.

In a specific implementation, the first device sends the scheduling type indication and the data type indication to the second device. That is, both the two indications need to be sent to the second device. Correspondingly, the second device receives the foregoing two indications.

In a specific implementation, implementation methods of the scheduling type indication and the data type indication include but are not limited to the following Method 1 to Method 4.

Method 1: The scheduling type indication is used to indicate that the at least one piece of code data includes the initially transmitted data, the retransmitted data, or the initially transmitted data and the retransmitted data. The data type indication is used to indicate location information (for example, may be a number or an index) and/or an amount of a part or all of the at least one piece of code data. It should be noted herein that, that the at least one piece of code data includes the initially transmitted data represents that the at least one piece of code data does not include retransmitted data (which may also be understood that the at least one piece of code data includes only the initially transmitted data from a perspective of data transmission). That the at least one piece of code data includes the retransmitted data represents that the at least one piece of code data does not include initially transmitted data (which may also be understood that the at least one piece of code data includes only the retransmitted data from a perspective of data transmission).

In an implementation, if the at least one piece of code data includes at least one code block, the scheduling type indication is used to indicate that the at least one code block includes initially transmitted data, retransmitted data, or initially transmitted data and retransmitted data, and the data type indication is used to indicate location information and/or a quantity of a part or all of the at least one code block.

In another implementation, if the at least one piece of code data includes at least one code block group, the scheduling type indication is used to indicate that the at least one code block group includes initially transmitted data, retransmitted data, or initially transmitted data and retransmitted data, and the data type indication is used to indicate location information and/or a quantity of a part or all of the at least one code block group.

For example, the scheduling type indication may be indicated by using a field including two bits. For example, 00, 01, and 10 are respectively used to indicate the foregoing three types. It should be noted that, in the foregoing example, 00, 01, and 10 respectively indicate the foregoing three types. Actually, any three of 00, 01, 10, and 11 may be used to indicate the foregoing three types. For another example, the retransmitted data may also be divided into retransmitted data in a unit of a transport block and retransmitted data in a unit of a code block group. That is, the scheduling type indication may be indicated by using a field including two bits. For example, 00 is used to indicate that the at least one piece of code data includes the initially transmitted data, 01 is used to indicate that the at least one piece of code data includes the retransmitted data in the unit of the transport block, 10 is used to indicate that the at least one piece of code data includes the retransmitted data in the unit of the code block, and 11 is used to indicate that the at least one piece of code data includes the retransmitted data (the retransmitted data may be in the unit of the transport block, and may be in the unit of the code block) and the initially transmitted data in a unit of a transport block; or 00 is used to indicate initial transmission in a unit of a transport block, 01 is used to indicate retransmission in a unit of a transport block, 10 is used to indicate retransmission in a unit of a code block group, and 11 is used to indicate hybrid transmission. It should be noted that in the foregoing example, which one of the four meanings specifically indicated by 00, 01, 10, and 11 is not limited, and may be determined during a specific implementation. For still another example, a type of the at least one piece of code data may be indicated implicitly. For example, a value of a modulation and coding scheme field ranges from 0 to 12 in a normal case, and the type can be determined based on the value of the modulation and coding scheme field. For example, if the value falls within the foregoing range, determining of whether only the initially transmitted data is included or both the initially transmitted data and the retransmitted data are included is performed, and whether only the initially transmitted data is included or both the initially transmitted data and the retransmitted data are included may be determined based on the specific value. For another example, if the value is out of the foregoing range, only the retransmitted data is included. It should be noted that when the scheduling type indication is used to indicate that the at least one piece of code data includes only the initially transmitted data, it may also be understood that the scheduling type indication is used to indicate only new transmission or only initial transmission. When the scheduling type indication is used to indicate that the at least one piece of code data includes only the retransmitted data, it may also be understood that the scheduling type indication is used to indicate only retransmission. When the scheduling type indication is used to indicate that the at least one piece of code data includes the initially transmitted data and the retransmitted data, it may also be understood that the scheduling type indication is used to indicate hybrid transmission.

In one scenario, if the scheduling type indication is used to indicate that the at least one piece of code data includes the initially transmitted data, the data type indication is used to indicate location information and/or an amount of the at least one piece of code data, and the at least one piece of code data is the initially transmitted data. Therefore, the second device can obtain the initially transmitted data based on the data type indication and the scheduling type indication.

In another scenario, if the scheduling type indication is used to indicate that the at least one piece of code data includes the retransmitted data, the data type indication is used to indicate location information and/or an amount of the at least one piece of code data, and the at least one piece of code data is the retransmitted data. Therefore, the second device can obtain the retransmitted data based on the data type indication and the scheduling type indication.

In still another scenario, if the scheduling type indication is used to indicate that the at least one piece of code data includes the initially transmitted data and the retransmitted data, the data type indication is used to indicate location information and/or an amount of the at least one piece of code data, or is used to indicate location information and/or an amount of the retransmitted data in the at least one piece of code data. Therefore, the second device can obtain the initially transmitted data and the retransmitted data based on the data type indication and the scheduling type indication.

Method 2: The scheduling type indication is used to indicate that the at least one piece of code data includes only the initially transmitted data or includes not only the initially transmitted data. The data type indication is used to indicate location information (for example, may be a number or an index) and/or an amount of a part or all of the at least one piece of code data.

It should be noted that when the at least one piece of code data includes at least one code block, the scheduling type indication is used to indicate that the at least one code block includes only initially transmitted data or includes not only initially transmitted data, and the data type indication is used to indicate location information and/or an amount of a part or all of the at least one code block. When the at least one piece of code data includes at least one code block group, the scheduling type indication is used to indicate that the at least one code block group includes only initially transmitted data or includes not only initially transmitted data, and the data type indication is used to indicate location information and/or a quantity of a part or all of the at least one code block group.

That the scheduling type indication is used to indicate that the at least one piece of code data includes only the initially transmitted data, or includes not only the initially transmitted data may also be understood that the scheduling type indication is used to indicate initial transmission, or is used to indicate non-initial transmission, where non-initial transmission indicates retransmission or hybrid retransmission (that is, the at least one piece of to-be-sent code data includes the initially transmitted data and retransmitted data). For example, the scheduling type indication may be indicated by using a field including one bit. For example, "0" is used to indicate that the at least one piece of code data includes only the initially transmitted data, and "1" indicates that the at least one piece of code data includes not only the initially transmitted data. For another example, a type of the at least one piece of code data may be indicated implicitly. Optionally, the type of the at least one piece of code data is indicated by using a modulation and coding scheme (MCS) field. For example, a value of a MCS field ranges from 0 to 12 in a normal case, and the type can be determined based on the value of the modulation and coding scheme field. For example, if the value falls within the foregoing range, that is, the value is any value from 0 to 12, it is determined that only the initially transmitted data is included. If the value is out of the foregoing range, that is, the value is any value other than 0 to 12, only the retransmitted data is included, or the initially transmitted data and the retransmitted data are included. For another example, a value of a modulation and coding scheme field ranges from 0 to 12 in a normal case. The value range may be divided into three intervals, and each interval corresponds to one code data transmission manner (that is, including only the initially transmitted data, including only the retransmitted data, or including the initially transmitted data and the retransmitted data). Therefore, the code data transmission manner can be determined based on the value of the field.

In one scenario, if the scheduling type indication is used to indicate that the at least one piece of code data includes only the initially transmitted data, the data type indication is used to indicate location information and/or an amount of the at least one piece of code data, and the at least one piece of code data is the initially transmitted data. Therefore, the second device can obtain the initially transmitted data based on the data type indication and the scheduling type indication.

In another scenario, if the scheduling type indication is used to indicate that the at least one piece of code data includes not only the initially transmitted data, the data type indication is used to indicate location information and/or an amount of the at least one piece of code data, and the at least one piece of code data is either retransmitted data or includes the initially transmitted data and retransmitted data. Therefore, the second device can determine, based on the data type indication, whether this transmission is retransmission only or hybrid transmission. For example, if the amount of code data indicated by the data type indication is less than or equal to an amount of code data in which a transmission error occurs last time, the second device determines that this transmission is retransmission only. For another example, if the amount of code data indicated by the data type indication is greater than an amount of code data in which a transmission error occurs last time, the second device determines that this transmission is hybrid transmission. For example, including only the retransmitted data may be transport block-based retransmission, or may be code block-based or code block group-based retransmission.

Method 3: The scheduling type indication includes L bits, where L is an integer greater than 1. Some bit statuses of the L bits are also used to indicate at least one of redundancy version information, a coding mode of a channel bit sequence, and a correspondence between a redundancy version and a coding mode; or some bit statuses of the L bits are used to indicate at least one of redundancy version information and a coding mode of a channel bit sequence. In conclusion, the scheduling type indication may be used to indicate a transmission manner. Optionally, L is equal to 3.

In an optional design, in addition to indicating that the at least one piece of code data includes the initially transmitted data, the retransmitted data, or the initially transmitted data and the retransmitted data, the scheduling type indication is also used to indicate other information. The data type indication is the same as that in Method 1 and Method 2, and is used to indicate location information (for example, may be a number or an index) and/or an amount of a part or all of the at least one piece of code data. The other information may be redundancy version information (for example, a redundancy version number), or a coding mode of a channel bit sequence, or a correspondence between a redundancy version and a coding mode ($Coding_{mode}$), for example, a coding mode used to obtain a channel bit sequence corresponding to a redundancy version. In the method, the scheduling type indication may also be referred to as an indication of a scheduling type and a redundancy version or an indication of a scheduling type, a redundancy version, and a coding mode. For example, a redundancy version 0 is used in initial transmission, and a redundancy version 1 is used in first retransmission. For explanations of the redundancy version, refer to the conventional technology. Generally, the RV is used to implement incremental redundancy (IR) HARQ transmission. For example, redundant bits generated by an encoder may be divided into several groups, each RV defines a transmission start point, and different RVs are used for initial transmission and retransmission, so as to implement gradual accumulation of redundant bits and complete an incremental redundancy HARQ operation; or bits generated by an encoder may be arranged in a specific manner, each RV defines a transmission start point, and corresponding bits are extracted, based on this start point in a specific manner, from the code bits generated by the encoder to form a channel bit sequence. For specific channel bit extraction manners in different redundancy versions of a polar code, refer to the following descriptions.

Specifically, there are at least three channel coding modes: a coding mode 1, a coding mode 2, and a coding mode 3. The coding modes 1 to 3 are used for redundancy versions whose numbers are greater than 0. Optionally, there is also a coding mode 0, which is used for a redundancy version 0. Specifically, different coding modes correspond to different manners for generating a channel bit sequence. It should be noted that different coding modes may correspond to same manners for generating a channel bit sequence in some scenarios corresponding to the different coding modes (for example, a scenario 0 corresponding to coding mode 1 and a scenario 1 corresponding to coding mode 2). However, on the whole, different coding modes correspond to different manners for generating a channel bit sequence.

Example 1: L indicates 3 bits. The 3 bits are used to indicate at least one of the following transmission manners: 000 indicates transport block-based initial transmission; 001 indicates transport block-based retransmission, and determining a channel bit sequence corresponding to a redundancy version 1 by using $Coding_{mode}=1$ or $Coding_{mode}=2$; 010 indicates transport block-based retransmission, and determining a channel bit sequence corresponding to a redundancy version 1 by using $Coding_{mode}=3$; 011 indicates code block group-based retransmission, and determining a channel bit sequence corresponding to a redundancy version 1 by using $Coding_{mode}=3$; 100 indicates code block group-based retransmission, and determining a channel bit sequence corresponding to a redundancy version 1 by using $Coding_{mode}=1$ or $Coding_{mode}=2$; 101 indicates code block group-based retransmission, and a redundancy version 2; 110 indicates code block group-based retransmission, and a redundancy version 3; and 111 indicates code block group-based hybrid transmission of initial transmission and retransmission, and determining a channel bit sequence corresponding to a redundancy version 1 by using $Coding_{mode}=3$. A person skilled in the art may learn that the foregoing is merely an example. The bit statuses indicating corresponding content may be changed or adjusted based on different bit status design manners. For example, 001 may be used to indicate transport block-based initial transmission.

It should be noted that the foregoing example is merely an example for description, and the transport block and the code block group represent only different code data types. A person skilled in the art may learn that the transport block and the code block group may also be replaced with another code data type according to an actual situation.

Example 2: L indicates 3 bits. The 3 bits are used to indicate at least one of the following: 000 indicates transport block-based initial transmission; 001 indicates transport block-based retransmission, and determining a channel bit sequence corresponding to a redundancy version 1 by using $Coding_{mode}=1$ or $Coding_{mode}=2$; 010 indicates transport block-based retransmission, and using a channel bit sequence corresponding to a redundancy version 2; 011 indicates transport block-based retransmission, and using a channel bit sequence corresponding to a redundancy version 3; 100 indicates code block group-based retransmission, and determining a channel bit sequence corresponding to a redundancy version 1 by using $Coding_{mode}=1$ or $Coding_{mode}=2$; 101 indicates code block group-based retransmission, and using a channel bit sequence corresponding to a redundancy version 2; 110 indicates code block group-based retransmission, and using a channel bit sequence corresponding to a redundancy version 3; and 111 indicates code block group-based hybrid transmission of initial transmission and retransmission, and determining a channel bit sequence corresponding to a redundancy version 1 by using $Coding_{mode}=3$.

In the foregoing indication manner, a correspondence between a bit status and a transmission manner is merely an example, and there may be another correspondence or only some of the foregoing transmission manners are indicated.

Method 4: The scheduling type indication is used to indicate that the at least one piece of code data includes the initially transmitted data, the retransmitted data, or the initially transmitted data and the retransmitted data. The data type indication is used to indicate location information (for example, may be a number or an index) and/or an amount of a part or all of the at least one piece of code data. The scheduling type indication may further include L bits, and some bit statuses of the L bits are also used to indicate a coding mode (or a coding mode corresponding to a redundancy version), for example, $Coding_{mode}$ 1, 2, or 3. Specifically, when the same redundancy version is used, a used coding mode may be indicated.

For example, for transport block-based retransmission, different bit statuses are used to indicate determining a channel bit sequence corresponding to a redundancy version 1 by using the coding mode. When the redundancy version is the same, different coding modes are available. For example, 001 indicates determining a channel bit sequence corresponding to a redundancy version 1 by using $Coding_{mode}=1$ or $Coding_{mode}=2$, and/or 010 indicates determining a channel bit sequence corresponding to a redundancy version 1 by using $Coding_{mode}=3$.

In a specific implementation, channel coding (for example, a polar/LDPC code) is performed on code blocks to generate bit sequences obtained after coding (referred to as encoded bit sequences), and rate matching is performed on these bit sequences to obtain channel bit sequences. Specifically, the coding mode $Coding_{mode}$ may also be understood as a manner for extracting a channel bit sequence from an encoded bit sequence. $N_{RV_0}$ is denoted (or M is indicated) as length of a bit sequence obtained after coding when a code block is transmitted for the first time, $E_{RV_0}$ is length of a channel bit sequence obtained after rate matching by using a redundancy version 0 (for example, the first transmission), $E_{RV_1}$ is length of a channel bit sequence obtained after rate matching by using a redundancy version 1 (for example, the second transmission), and K indicates length of the code block (not limited to including or not including length of CRC). The following rate matching modes are obtained based on the length of the code block and a length relationship between $E_{RV_0}$ and $E_{RV_1}$ and $N_{RV_0}$.

| | Rate matching mode condition | Rate matching mode $RM_{mode}$ |
|---|---|---|
| $K/E_{RV0} > 7/16$ | $E_{RV0} \leq E_{RV1}$ | $RM_{mode} = 1$ |
| | $\min(N_{RV0}, E_{RV0})/2 \leq E_{RV1} < E_{RV0}$ | $RM_{mode} = 2$ |
| | $E_{RV0}/6 \leq E_{RV1} < \min(N_{RV0}, E_{RV0})/2$ | $RM_{mode} = 3$ |
| | $E_{RV1} < E_{RV0}/6$ | $RM_{mode} = 4$ |
| | $K/E_{RV0} \leq 7/16$ | $RM_{mode} = 5$ |

$Coding_{mode}=0$ corresponds to an encoded bit sequence corresponding to initially transmitted data, $Coding_{mode}=1$ corresponds to an encoded bit sequence corresponding to retransmitted data, and a code block needs to be re-encoded to generate a new encoded bit sequence; $Coding_{mode}=2$ corresponds to an encoded bit sequence corresponding to retransmitted data, and a code block does not need to be re-encoded, and an encoded bit sequence generated during last transmission or initial transmission may be used, where when $Coding_{mode}=1$ and $Coding_{mode}=2$, different rate matching modes are determined based on the length K of the code block and the length relationship between $E_{RV_0}$ and $E_{RV_1}$ and $N_{RV_0}$. As shown in the following table, a channel bit sequence is generated; and $Coding_{mode}=3$ also indicates that no re-encoding is required in retransmission, and no rate matching mode is determined, but only a channel bit sequence needs to be generated based on the length K of the code block and the length relationship between $E_{RV_0}$, $E_{RV_1}$ and $N_{RV_0}$.

The following table lists a correspondence between a coding mode and a rate matching mode.

| Coding mode | Rate matching mode $RM_{mode}$ |
|---|---|
| 1 | $RM_{mode} = 1$ |
| | $RM_{mode} = 2$ |
| | $RM_{mode} = 3$ |
| 2 | $RM_{mode} = 4$ |
| | $RM_{mode} = 5$ |

In first transmission, a channel bit sequence is a sequence corresponding to a redundancy version 0, and is represented by $$e_0^0, e_1^0, e_2^0, \ldots, e_{E_{RV0}-1}^0;$$

in second transmission, a channel bit sequence is a sequence corresponding to a redundancy version 1, and is represented by $$e_0^1, e_1^1, e_2^1, \ldots, e_{E_{RV1}-1}^1;$$

a sequence corresponding to a redundancy version 2 is represented by $$e_0^2, e_1^2, e_2^2, \ldots, e_{E_{RV2}-1}^2;$$

and a sequence corresponding to a redundancy version 3 is represented by $$e_0^3, e_1^3, e_2^3, \ldots, e_{E_{RV3}-1}^3,$$

where $E_{RV_2}$ is length of a channel bit sequence obtained after rate matching is performed when the redundancy version 2 is used for transmission, and $E_{RV_3}$ is length of a channel bit sequence obtained after rate matching is performed when the redundancy version 3 is used for transmission. The sequence corresponding to the redundancy version 0 and the sequence corresponding to the redundancy version 1 form a cyclic buffer:

$$z = [e_0^0, e_1^0, \ldots, e_{E_{RV0}-1}^0, e_0^1, e_1^1, \ldots, e_{E_{RV1}-1}^1].$$

A manner for generating $$e_0^2, e_1^2, e_2^2, \ldots, e_{E_{RV2}-1}^2$$

is as follows:

for $k = 0$ to $E_{RV2} - 1$ $e_k^2 = z_{mod(k, E_{RV0}+E_{RV1})}$; // cyclically read end for A manner for generating $$e_0^3, e_1^3, e_2^3, \ldots, e_{E_{RV3}-1}^3$$

is as follows:

for $k = 0$ to $E_{RV3} - 1$ $e_k^3 = z_{mod(k+E_{RV0}, E_{RV0}+E_{RV1})}$; // cyclically read end for A manner for obtaining a channel bit sequence may be related to at least one of a coding mode $\text{Coding}_{mode}$, length $E_{RV_0}$ of a channel bit sequence obtained after rate matching during first transmission, a ratio of the length K of the code block to the length $E_{RV_0}$ of the channel bit sequence obtained after rate matching during the first transmission, and a rate matching mode $\text{RM}_{mode}$. It may also be understood that a channel bit sequence may be obtained based on at least one of a coding mode $\text{Coding}_{mode}$, length $E_{RV_0}$ of a channel bit sequence obtained after rate matching during first transmission, a ratio of the length K of the code block to the length $E_{RV_0}$ of the channel bit sequence obtained after rate matching during the first transmission, and a rate matching mode $\text{RM}_{mode}$.

In the following description, y represents a bit sequence output after sub-block interleaving is performed on an encoded bit sequence, length of the bit sequence is the same as length ($N_{RV_0}$ or M) of the encoded bit sequence, and mod (a, b) represents a remainder obtained after a is divided by b. For sub-block interleaving processing, refer to descriptions in the conventional technology, for example, a sub-block interleaving technology in 5G, or a sub-block interleaving processing manner designed or improved by a person skilled in the art with reference to a sub-block interleaving technology in the conventional technology. A specific manner and definition of sub-block interleaving are not limited in this application. For example, it is assumed that length of an encoded bit sequence obtained after polar coding is Length, the encoded bit sequence is divided into 32 sub-blocks, and length of each sub-block is Length/32. Then, interleaving is performed based on a sub-block interleaving pattern. Interleaving may be disordering code streams in an original sequence according to a specific rule. In this way, centralized errors generated in a burst can be dispersed to a maximum extent.

For example, a manner for obtaining a channel bit sequence corresponding to a coding mode 0 meets at least one of the following:

if $E_{RV0}$ is greater than or equal to $M$, $e_k = y_{mod(k,M)}$;

$K/E_{RV0} \leq 7/16$, $e_k = y_{k+M-E_{RV0}}$; or in other cases, $e_k = y_k$, where $k$ belongs to $\{0, E_{RV0} - 1\}$.

For another example, a manner for obtaining a channel bit sequence corresponding to a coding mode 1 meets at least one of the following:

if a rate matching mode is 1, $e_k = y_{mod(k,M)}$;

if a rate matching mode is 2, $e_k = y_{mod(k+min(E_{RV0},M)-E_{RV1},M)}$; or if a rate matching mode is 3, $e_k = y_{mod(k+M/2-E_{RV1},M/2)}$; where $k$ belongs to $\{0, E_{RV1} - 1\}$.

For still another example, a manner for obtaining a channel bit sequence corresponding to a coding mode 2 meets at least one of the following:

if a rate matching mode is 4, $e_k = y_{mod(k+min(E_{RV0},M)-E_{RV1},M)}$; or if a rate matching mode is 5, $e_k = y_{mod(k-(E_{RV0}+E_{RV1}-M),M)}$, where $k$ belongs to $\{0, E_{RV1} - 1\}$.

For yet another example, a manner for obtaining a channel bit sequence corresponding to a coding mode 3 meets at least one of the following:

if $K/E_{RV0} > 7/16$, $e_k = y_{mod(k+(min(E_{RV0},M)-E_{RV1}),min(E_{RV0},M))}$; or if $K/E_{RV0} \leq 7/16$, $e_k = y_{mod(k-(E_{RV0}+E_{RV1}-M),M)}$, where $k$ belongs to $\{0, E_{RV1} - 1\}$.

In an optional design, refer to the following pseudocode:

```
if Coding_mode = 0 //initial transmission code
    if E_RV0 ≥ M //repeat
        for k = 0 to E_RV0 - 1
            e_k = y_mod(k,M);
        end for
    else
        if K/E_RV0 ≤ 7/16//puncture
            for k = 0 to E_RV0 - 1
                e_k = y_k+M-E_RV0;
            end for
        else //shorten
            for k = 0 to E_RV0 - 1
                e_k = y_k;
            end for
        end if
    end if
else if Coding_mode = 1 //retransmission code
    if RM_mode = 1
        for k = 0 to E_RV1 - 1
            e_k = y_mod(k,M);
        end for
    else if RM_mode = 2
        for k = 0 to E_RV1 - 1
            e_k = y_mod(k+min(E_RV0,M)-E_RV1,M);
        end for
    else if RM_mode = 3
        for k = 0 to E_RV1 - 1
            e_k = y_mod(k+M/2-E_RV1,M/2);
        end for
    end if
else if Coding_mode = 2 //retransmission without coding
    if RM_mode = 4
        for k = 0 to E_RV1 - 1
            e_k = y_mod(k+min(E_RV0,M)-E_RV1,M);
        end for
    else if RM_mode = 5
        for k = 0 to E_RV1 - 1
            e_k = y_mod(k-(E_RV0+E_RV1-M),M);
        end for
    end if
else if Coding_mode = 3 //retransmission without coding
    if K/E_RV0 > 7/16
        for k = 0 to E_RV1 - 1
            e_k = y_mod(k+(min(E_RV0,M)-E_RV1),min(E_RV0,M));
        end for
```

-continued

```
else if K/E_RV0 ≤ 7/16
    for k = 0 to E_RV1 − 1
        e_k = y_mod(k−(E_RV0+E_RV1−M),M);
    end for
end if
end if
```

Based on the foregoing explanations, it can be learned that different coding modes totally correspond to different manners for generating a channel bit sequence. However, manners for generating $e_k$ corresponding to the coding mode 0 and the coding mode 1 are the same in some scenarios, for example, $e_k = y_{mod(k,M)}$. A person skilled in the art may know that the foregoing example is merely a possible implementation, and a rate matching process may be performed in another implementation.

In any one of the foregoing Method 1 to Method 4, the scheduling type and the location information and/or the amount of the to-be-sent code data can be indicated.

In an implementation method, in any one of the foregoing methods, when the scheduling type indication is used to indicate that the at least one piece of code data includes only the initially transmitted data, it may be predefined to initially transmit one transport block. In this case, the second device can learn of location information and/or a quantity of code blocks or code block groups included in the to-be-sent transport block. Therefore, the data type indication cannot be required, or the data type indication is used for another purpose in this case. It may be understood that in step 302, the first device sends the scheduling type indication to the second device. Correspondingly, the second device receives the scheduling type indication. Further, optionally, the first device may send the data type indication, where the data type indication is used to indicate location information and/or an amount of a part or all of the at least one piece of code data, or is used to indicate other information; or the first device does not send a data type indication.

In an implementation method, the scheduling type indication and the data type indication may be carried in one piece of DCI or higher layer signaling for scheduling.

Step 303: The first device sends the at least one piece of code data to the second device. Correspondingly, the second device receives the at least one piece of code data.

It should be noted that there is no strict execution sequence between step 302 and step 303. Step 302 may be performed first, or step 303 may be performed first, or steps 302 and 303 are performed simultaneously.

Step 304: The second device obtains the at least one piece of code data based on the at least one of the scheduling type indication and the data type indication.

Specifically, the second device determines, based on the scheduling type indication, whether the at least one piece of code data includes only the initially transmitted data, or only the retransmitted data, or the initially transmitted data and the retransmitted data, and obtains the initially transmitted data, or the retransmitted data, or the initially transmitted data and the retransmitted data based on the data type indication.

In this solution, when sending the code data to the second device, the first device may choose to send only the initially transmitted data, the retransmitted data, or the initially transmitted data and the retransmitted data based on the to-be-sent code data and a currently available physical resource. This can maximize utilization of the available physical resource, improve physical resource utilization, and reduce resource waste.

Descriptions are provided below by using the implementation method 1 corresponding to the scheduling type indication and the data type indication described in step 302 as an example. It should be noted that, for a specific implementation method of the implementation method 2 corresponding to the scheduling type indication and the data type indication described in step 302, refer to a specific implementation of the implementation method 1. Details are not described again.

The following specifically describes the foregoing implementation method 1 in three different cases.

Case 1: The at least one piece of code data includes the initially transmitted data and the retransmitted data.

In this case, the first device can send the initially transmitted data and the retransmitted data to the second device during one time of resource scheduling, and this can improve resource utilization to a maximum extent. Specifically, the at least one piece of code data includes the at least one piece of transport block data and the at least one piece of code block data, the at least one piece of transport block data is the initially transmitted data, the at least one piece of code block data is the retransmitted data, and the at least one piece of code block data may be at least one code block or at least one code block group. It may be understood that the at least one piece of transport block data may include at least one code block or at least one code block group used as the initially transmitted data, and the at least one piece of transport block data is transmitted in a manner for a transport block.

In this case, the scheduling type indication is used to indicate that the at least one piece of code data includes the initially transmitted data and the retransmitted data.

For example, the following provides implementation methods of the data type indication in Case 1, including but not limited to the following method 1 and method 2.

Implementation method A: The data type indication is a bitmap, the bitmap includes N bits, N is pre-configured (for example, configured by a network management system), or predefined (for example, defined by a system), or is notified by using signaling (for example, notified by using higher layer signaling or another signaling), N is used to indicate a maximum quantity of code blocks or code block groups included in a transport block, N is an integer greater than 1, and the bitmap is used to indicate location information and/or an amount of the at least one piece of code data.

The bitmap indicates location information and/or amounts of the initially transmitted data (namely, the at least one piece of transport block data) and the retransmitted data (namely, the at least one piece of code block data) in the to-be-sent code data, but does not distinguish between the initially transmitted data and the retransmitted data. Alternatively, it may be understood that the second device may learn of, based on the bitmap, the total amount and the location information of the code data sent in this transmission, but cannot distinguish between the initially transmitted data and the retransmitted data in the code data. The second device needs to distinguish between the initially transmitted data and the retransmitted data from the received code data based on other information. Because the second device is a receiver of the code data, the second device may know code data in which a transmission error occurs last time and send feedback information to the first device, where the feedback information is used to indicate the code data in which the transmission error occurs. Therefore, the second device can determine, based on the location information of the received code data, the retransmitted data and the initially transmitted data. That is, optionally, the method further includes the following step: The second device sends feedback information to the first device, where the feedback information is used to indicate a transmission error or a reception failure of the at least one piece of code data. Further, the first device performs step 301.

Implementation method B: The data type indication is a bitmap, the bitmap includes N bits, N is pre-configured (for example, configured by a network management system), or predefined (for example, defined by a system), or is notified by using signaling (for example, notified by using higher layer signaling or another signaling), N is used to indicate a maximum quantity of code blocks or code block groups included in a transport block, N is an integer greater than 1, and the bitmap is used to indicate location information and/or an amount of the retransmitted data (namely, the at least one of code block data) in the at least one piece of code data. Further optionally, step 302 further includes: The first device sends indication information to the second device, where the indication information is used to indicate location information and/or amount of the initially transmitted data (namely, the at least one piece of transport block data) in the at least one piece of code data.

The second device may learn of the location information and/or the amount of the retransmitted data in this transmission based on the bitmap, to obtain the retransmitted data. Further optionally, the second device may also determine the location information and/or the amount of the initially transmitted data based on the bitmap and the indication information, to obtain the initially transmitted data.

In an actual application, a method for implementing a relationship between the at least one piece of code data to be sent this time and code data sent last time includes but is limited to the following implementation methods.

Implementation method 1: A quantity, location information, and sizes of code block groups included in the retransmitted data (namely, the at least one piece of code block data) in the at least one piece of code data to be sent this time are the same as a quantity, location information, and sizes of code block groups included in the retransmitted data during initial transmission. Further, an amount, location information, and a size of code data included in the initially transmitted data (namely, the at least one piece of transport block data) in the at least one piece of code data are the same as or correspondingly the same as an amount, location information, and a size of code data that is successfully transmitted in the code data transmitted last time. It may be understood that the initially transmitted data in the at least one piece of code data and the code data that is successfully transmitted in the code data transmitted last time are at a same location with the same amount and size.

For the retransmitted data in the at least one piece of code data, for example, if sent code data is a code block, an amount, location information, and a size of the retransmitted data (namely, the at least one code block) in the at least one code block to-be-sent this time are the same as a quantity, location information, and sizes of code blocks included in the retransmitted data during initial transmission. For another example, if sent data is a code block group, a quantity, location information, and sizes of code block groups (referred to as first coding block groups) included in the retransmitted data (namely, the at least one code block group) in the at least one code block group to-be-sent this time are the same as a quantity, location information, and sizes of code block groups (referred to as second code block groups) included in the retransmitted data during initial transmission. That the size of the first code block group is the same as the size of the second code block group means that a quantity and sizes of code blocks included in the first code block group are respectively the same as those of code blocks included in the second code block group.

For the initially transmitted data in the at least one piece of code data, in a first implementation method, the location information and the size of the initially transmitted data (namely, the at least one piece of transport block data) in the at least one piece of code data are correspondingly the same as the location information and the size of code data that is successfully transmitted in the code data sent last time. For example, if sent code data is a code block, an amount, location information, and a size of the initially transmitted data (namely, the at least one piece of transport block data) in the at least one code block are the same as a quantity, location information, and sizes of code blocks that are successfully transmitted in code blocks transmitted last time. For another example, if sent code data is a code block group, a quantity, location information, and sizes of code block groups (referred to as third code block groups) included in the initially transmitted data (namely, the at least one piece of transport block data) in the at least one piece of code data are the same as a quantity, location information, and sizes of code block groups (referred to as fourth code block groups) that are successfully transmitted in code block groups transmitted last time. That the size of the third code block group is the same as that of the fourth code block group means that a quantity and sizes of code blocks included in the third code block group are respectively the same as those of code blocks included in the fourth code block group.

For the initially transmitted data in the at least one piece of code data, in a second implementation method, the first device may determine, based on a physical resource used for the at least one piece of code data and a MCS, the sizes and the quantity of the code blocks or the code block groups included in the initially transmitted data in the at least one piece of code data. For example, when the code data is a code block, the first device may first determine, based on the allocated physical resource and the MCS, an amount of data that can be sent; then determine, based on the amount of data that can be sent and the data amount corresponding to the retransmitted data in the at least one piece of code data, the data amount corresponding to the initially transmitted data in the at least one piece of code data; and finally determine, based on the data amount corresponding to the initially transmitted data and the quantity of code blocks included in the initially transmitted data, the size of the code block included in the initially transmitted data. The determined quantity, location information, and sizes of code blocks included in the initially transmitted data in the at least one piece of code data are the same as the quantity, the location information, and the sizes of code blocks or code block groups included in the code data that is successfully transmitted in the code data transmitted last time. For another example, when the code data is a code block group, the first device may first determine, based on the allocated physical resource and the MCS, an amount of data that can be sent; then determine, based on the amount of data that can be sent and the data amount corresponding to the retransmitted data in the at least one piece of code data, the data amount corresponding to the initially transmitted data in the at least one piece of code data; and finally determine, based on the data amount corresponding to the initially transmitted data and the quantity of code block groups included in the initially transmitted data, the size of the code block group included in the initially transmitted data. Specifically, the first device determines the quantity and sizes of the code blocks in the code block group included in the initially transmitted data. It should be noted that the determined quantity, location information, and sizes of the code block groups (referred to as fifth code block groups) included in the initially transmitted data in the at least one piece of code data are the same as the quantity, the location information, and the sizes of code block groups (referred to as sixth code block groups) included in the code data that is successfully transmitted in the code data transmitted last time. In addition, a quantity and sizes of code blocks included in the fifth code block group may be respectively the same as or different from those of code blocks included in the sixth code block group.

Implementation method 2: A quantity, location information, and sizes of code block groups included in the retransmitted data (namely, the at least one piece of code block data) in the at least one piece of code data to be sent this time are the same as a quantity, location information, and sizes of code block groups included in the retransmitted data during initial transmission. An amount of the initially transmitted data (namely, the at least one piece of transport block data) in the at least one piece of code data is less than an amount of code data that is successfully transmitted in the code data transmitted last time.

An implementation method for the retransmitted data in the at least one piece of code data is the same as the implementation method for the retransmitted data in the at least one piece of code data in the foregoing implementation method 1. For details, refer to the foregoing descriptions. Details are not described again.

For the initially transmitted data in the at least one piece of code data, in a first implementation method, location information and a size of the initially transmitted data in the at least one piece of code data are correspondingly the same as location information and a size of a part of code data that is successfully transmitted in the code data sent last time. For example, when the code data is a code block, location information and a size of an initially transmitted code block in the at least one code block are correspondingly the same as location information and sizes of some code blocks in code data that is successfully transmitted in the code data sent last time, and a quantity of initially transmitted code blocks in the at least one code block is less than a quantity of code blocks that are successfully transmitted in the code data sent last time. For another example, when the code data is a code block group, location information and a size of a code block group (referred to as a seventh code block group) included in the initially transmitted data in the at least one code block group are correspondingly the same as location information and sizes of some code block groups (referred to as eighth code block groups) in code block groups that are successfully transmitted in code block groups sent last time, and a quantity of code block groups included in the initially transmitted data in the at least one code block group is less than a quantity of code block groups that are successfully transmitted in the code block groups sent last time. That the size of the seventh code block group is the same as that of the eighth code block group means that a quantity and sizes of code blocks included in the seventh code block group are respectively the same as those of code blocks included in the eighth code block group.

For the initially transmitted data in the at least one piece of code data, in a second implementation method, the first device may determine, based on a physical resource used for the at least one piece of code data and a MCS, the sizes and the quantity of the code blocks or the code block groups included in the initially transmitted data in the at least one piece of code data. For example, when the code data is a code block, the first device may first determine, based on the allocated physical resource and the MCS, an amount of data that can be sent; then determine, based on the amount of data that can be sent and the data amount corresponding to the retransmitted data in the at least one piece of code data, the data amount corresponding to the initially transmitted data in the at least one piece of code data; and finally determine, based on the data amount corresponding to the initially transmitted data and the quantity of code blocks included in the initially transmitted data, the size of the code block included in the initially transmitted data. For another example, when the code data is a code block group, the first device may first determine, based on the allocated physical resource and the MCS, an amount of data that can be sent; then determine, based on the amount of data that can be sent and the data amount corresponding to the retransmitted data in the at least one piece of code data, the data amount corresponding to the initially transmitted data in the at least one piece of code data; and finally determine, based on the data amount corresponding to the initially transmitted data and the quantity of code block groups included in the initially transmitted data, the size of the code block group included in the initially transmitted data. Specifically, the first device determines the quantity and sizes of the code blocks in the code block group included in the initially transmitted data. It should be noted that the determined quantity, location information, and sizes of the code block groups (referred to as ninth code block groups) included in the initially transmitted data in the at least one piece of code data are the same as the quantity, the location information, and the sizes of code block groups (referred to as tenth code block groups) included in a part of code data that is successfully transmitted in the code data transmitted last time. In addition, a quantity and sizes of code blocks included in the ninth code block group may be respectively the same as or different from those of code blocks included in the tenth code block group.

Implementation method 3: A quantity, location information, and sizes of code block groups included in the retransmitted data (namely, the at least one piece of code block data) in the at least one piece of code data to be sent this time are the same as a quantity, location information, and sizes of code block groups included in the retransmitted data during initial transmission. An amount of the initially transmitted data (namely, the at least one piece of transport block data) in the at least one piece of code data is greater than an amount of code data that is successfully transmitted in the code data transmitted last time.

An implementation method for the retransmitted data in the at least one piece of code data is the same as the implementation method for the retransmitted data in the at least one piece of code data in the foregoing implementation method 1. For details, refer to the foregoing descriptions. Details are not described again.

For the initially transmitted data in the at least one piece of code data, in an implementation method, the first device may determine, based on a physical resource used for the at least one piece of code data and a MCS, the sizes and the quantity of the code blocks or the code block groups included in the initially transmitted data in the at least one piece of code data. For example, when the code data is a code block, the first device may first determine, based on the allocated physical resource and the MCS, an amount of data that can be sent; then determine, based on the amount of data that can be sent and the data amount corresponding to the retransmitted data in the at least one piece of code data, the data amount corresponding to the initially transmitted data in the at least one piece of code data; and finally determine, based on the data amount corresponding to the initially transmitted data and the quantity of code blocks included in the initially transmitted data, the size of the code block included in the initially transmitted data. For another example, when the code data is a code block group, the first device may first determine, based on the allocated physical resource and the MCS, an amount of data that can be sent; then determine, based on the amount of data that can be sent and the data amount corresponding to the retransmitted data in the at least one piece of code data, the data amount corresponding to the initially transmitted data in the at least one piece of code data; and finally determine, based on the data amount corresponding to the initially transmitted data and the quantity of code block groups included in the initially transmitted data, the size of the code block group included in the initially transmitted data. Specifically, the first device determines the quantity and sizes of the code blocks in the code block group included in the initially transmitted data.

It should be noted that the foregoing implementation method 1 to implementation method 3 may all be implemented in combination with the foregoing implementation method A or implementation method B of the data type indication.

With reference to any one of the foregoing implementation method 1 to implementation method 3, in a possible implementation method, a first physical resource for mapping code data in the at least one piece of code data is allocated according to an allocation rule corresponding to a transport block including the at least one piece of code data. That is, the first device equates the at least one piece of code data with one transport block, and then allocates a physical resource to a corresponding code block or code block group in each piece of code data in the at least one piece of code data according to the allocation rule corresponding to the transport block. Allocating the physical resource includes determining length of bits obtained after rate matching of code blocks or code block groups and how the bits obtained after rate matching are mapped to the physical resource. Alternatively, it may be understood that step 303 in which the first device sends the at least one piece of code data to the second device specifically includes: The first device maps the at least one piece of code data to the first physical resource, and sends the at least one piece of code data to the second device, where a mapping manner in which a code block or a code block group included in the at least one piece of code data is mapped to the first physical resource meets a predefined transport block mapping rule.

In this embodiment of this application, in a case, the at least one piece of code data sent by the first device to the second device is the initially transmitted data. In an example in which the code data is divided into a code block, the code block included in the at least one piece of code data is used as a whole and is referred to as a transport block. To be specific, transmission may be performed at a granularity of the transport block or at a granularity of the code block during initial transmission. In an example in which the code data is divided into a code block group, the code block group included in the at least one piece of code data is used as a whole and is referred to as a transport block. To be specific, transmission may be performed at a granularity of the transport block or at a granularity of the code block group during initial transmission.

In another case, the at least one piece of code data sent by the first device to the second device is the retransmitted data. In an example in which the code data is divided into a code block, the code block included in the at least one piece of code data is used as a whole and is referred to as a transport block. To be specific, transmission may be performed at a granularity of the transport block or at a granularity of the code block during retransmission. In an example in which the code data is divided into a code block group, the code block group included in the at least one piece of code data is used as a whole and is referred to as a transport block. To be specific, transmission may be performed at a granularity of the transport block or at a granularity of the code block group during retransmission.

In still another case, the at least one piece of code data sent by the first device to the second device includes the initially transmitted data and the retransmitted data. In an example in which the code data is divided into a code block, the code block included in the at least one piece of code data is used as a whole and is referred to as an equivalent transport block or a logical transport block, where the logical transport block includes at least one initially transmitted transport block and at least one retransmitted transport block, or at least one initially transmitted transport block and at least one retransmitted code block. In an example in which the code data is divided into a code block group, the code block group included in the at least one piece of code data is used as a whole and is referred to as an equivalent transport block or a logical transport block, where the logical transport block includes at least one initially transmitted transport block and at least one retransmitted transport block, or at least one initially transmitted transport block and at least one retransmitted code block group.

Implementation methods are described below with reference to examples. In addition, the scheduling type indication and the data type indication in the following examples are described by using the implementation method 1 of the scheduling type indication and the data type indication described in step 302 as an example.

It should be noted that, in the following examples, meanings of 0 and 1 in the bitmap are merely examples. In an actual application, meanings indicated by 0 and 1 in some or all of the following examples may be exchanged, that is, a meaning indicated by 0 may be indicated by 1, and a meaning indicated by 1 may be indicated by 0 in the following examples.

For ease of description, an example in which the code data is the code block group is used below for description. To be specific, the first device divides the transport block into one or more code block groups for sending. In the following examples, each transport block is divided into a maximum of eight code block groups (that is, N=8 in the following examples). Location information of the eight code block groups is a CBG 0, a CBG 1, a CBG 2, a CBG 3, a CBG 4, a CBG 5, a CBG 6, and a CBG 7. In this case, the bitmap includes eight bits, and each bit corresponds to one code block group and is used to indicate whether there is data to be sent in the code block group. For example, "1" is used to indicate to send a corresponding code block group, and "0" is used to indicate to skip sending a corresponding code data block group.

It is assumed that the first device sends a CBG 0, a CBG 1, a CBG 2, and a CBG 3 to the second device during previous sending, and then receives feedback information from the second device, where the feedback information indicates that a transmission error occurs in the CBG 1. Therefore, the first device needs to retransmit the CBG 1 during next transmission.

If the foregoing implementation method 1 is used, code data sent next time is also a CBG 0, a CBG 1, a CBG 2, and a CBG 3, where the CBG 1 is retransmitted data, and a quantity and sizes of CBs included in the CBG 1 are respectively the same as those of CBs in the CBG 1 sent last time. The CBG 0, the CBG 2, and the CBG 3 are initially transmitted data, and the CBG 0, the CBG 2, and the CBG 3 form an initially transmitted transport block, where a quantity and sizes of CBs included in the CBG 0 are respectively the same as those of CBs included in the CBG 0 sent last time, a quantity and sizes of CBs included in the CBG 2 are respectively the same as a quantity and sizes of CBs included in the CBG 2 sent last time, and a quantity and sizes of CBs included in the CBG 3 are respectively the same as those of CBs included in the CBG 3 sent last time.

In the implementation method 1, when the foregoing implementation method A is used for the data type indication, the data type indication is a bitmap, and the bitmap is shown in FIG. 4A. Bit locations corresponding to the CBG 0, the CBG 1, the CBG 2, and the CBG 3 in the bitmap are 1, and are used to indicate that the location information of the at least one piece of sent code data is respectively the CBG 0, the CBG 1, the CBG 2, and the CBG 3, and a total of four CBGs are sent. Bit information corresponding to the initially transmitted data (namely, the CBG 0, the CBG 2, and the CBG 3) and bit information corresponding to the retransmitted data (namely, the CBG 1) are 1. Bit locations corresponding to the CBG 4, the CBG 5, the CBG 6, and the CBG 7 in the bitmap are 0, and are used to indicate that there is no code data sent in the CBG 4, the CBG 5, the CBG 6, and the CBG 7. After receiving the bitmap, the second device may learn of that a total of four CBGs are sent this time: the CBG 0, the CBG 1, the CBG 2, and the CBG 3. Then, the second device may determine, based on the feedback information (used to indicate that the transmission error occurs in the CBG 1) sent to the first device last time, that the received CBG 0, CBG 2, and CBG 3 are the initially transmitted data, and the received CBG 1 is the retransmitted data. In the implementation method 1, when the foregoing implementation method A is used for the data type indication, the data type indication is a bitmap, and the bitmap may also be shown in FIG. 4B. A bit location corresponding to the CBG 1 in the bitmap is 1, and is used to indicate that the CBG 1 is the retransmitted data. Bit locations corresponding to the CBG 0, the CBG 2, and the CBG 3 in the bitmap are 0, and are used to indicate that the CBG 0, the CBG 2, and the CBG 3 are the initially transmitted data. Bit locations corresponding to the CBG 4, the CBG 5, the CBG 6, and the CBG 7 in the bitmap are 0, and are used to indicate that there is no code data sent in the CBG 4, the CBG 5, the CBG 6, and the CBG 7. After receiving the bitmap, the second device may learn of, based on that the CBGs transmitted last time are the CBG 0 to the CBG 4, that the CBGs transmitted this time are also the CBG 0 to the CBG 4. In addition, the second device learns of, based on the bitmap, because the bit location corresponding to the CBG 1 is 1, that the CBG 1 is the retransmitted data, and because the bit locations corresponding to the CBG 0, the CBG 2, and the CBG 3 are 0, that the CBG 0, the CBG 2, and the CBG 3 are the initially transmitted data. In the implementation method 1, when the foregoing implementation method B is used for the data type indication, the data type indication is a bitmap, and the bitmap is shown in FIG. 7. A bit location corresponding to the CBG 1 in the bitmap is 1, and is used to indicate that location information of the at least one piece of sent retransmitted data is the CBG 1. Indication information is used to indicate that there are three pieces of initially transmitted data in the at least one piece of sent code data. To be specific, a total of four CBGs are sent. Bit locations corresponding to the CBG 0, CBG 2, CBG 3, CBG 4, CBG 5, the CBG 6, and the CBG 7 in the bitmap are 0, and are used to indicate that there is no retransmitted data sent in the CBG 0, CBG 2, CBG 3, CBG 4, CBG 5, the CBG 6, and the CBG 7. After receiving the bitmap, the second device may learn of that the retransmitted data sent this time is the CBG 1, and determine, based on the bitmap and the indication information, that the initially transmitted data is the CBG 0, the CBG 2, and the CBG 3.

In addition, if physical resource configuration, an MCS, and the like in this transmission are the same as those in a previous transmission configuration, a physical resource for mapping CBG 0 is the same as a physical resource for mapping the CBG 0 sent last time, a physical resource for mapping the CBG 1 is the same as a physical resource for mapping the CBG 1 sent last time, a physical resource for mapping the CBG 2 is the same as a physical resource for mapping the CBG 2 sent last time, and a physical resource for mapping the CBG 3 is the same as a physical resource for mapping the CBG 3 sent last time; otherwise, a principle for allocating physical layer resources between the CBG 0, the CBG 1, the CBG 2, and the CBG 3 may be determined based on a case in which these CBGs belong to a same transport block.

In addition, the principle for allocating the physical layer resources between the CBG 0, the CBG 1, the CBG 2, and the CBG 3 may be determined based on a case in which these CBGs belong to a same transport block. For example, a preset quantity of bits are first allocated, according to a principle of equal division as much as possible, to CBs included in the equivalent transport block including the CBG 0, the CBG 1, the CBG 2, and the CBG 3. For example, the equivalent transport block including the CBG 0, the CBG 1, the CBG 2, and the CBG 3 includes 10 CBs in total, the preset quantity of bits is 1000 bits, and 100 bits are allocated to each CB. A CB-to-bit matching process is also referred to as rate matching. Then, the preset quantity of bits are mapped to a physical resource for sending. It should be noted that during specific implementation, the CBs may be sequentially matched to the preset quantity of bits according to a sorting order of the CBs included in the equivalent transport block including the CBG 0, the CBG 1, the CBG 2, and the CBG 3.

Specifically, a quantity of bits that can be transmitted at a physical layer (namely, a quantity of code bits that can be used in the transport block) is G, $N_L$ represents a quantity of layers to which the transport block is mapped, $Q_m$ represents a modulation order, $E_r$ represents length of each code block after rate matching, and r represents a sequence number of a code block and ranges from 0 to C'−1, where C' represents a total quantity of code blocks. When r is less than or equal to $$C' - \mathrm{mod}(G/(N_L * Q_m), C') - 1, E_r = N_L \cdot Q_m \cdot \left\lfloor \frac{G}{N_L \cdot Q_m \cdot C'} \right\rfloor;$$

$$\text{otherwise, } E_r = N_L \cdot Q_m \cdot \left\lceil \frac{G}{N_L \cdot Q_m \cdot C'} \right\rceil,$$

where mod represents a modulo operation, $\lceil \ \rceil$ represents rounding up, and $\lfloor \ \rfloor$ represents rounding down. For example, the equivalent transport block including the CBG 0, the CBG 1, the CBG 2, and the CBG 3 includes 10 CBs in total. In this case, C'=10. If a modulation scheme is quadrature phase-shift keying (QPSK), $Q_m=2$, $N_L=1$, and G=1000. Then, length of each code block obtained after rate matching may be calculated.

If the foregoing implementation method 2 is used, code data sent next time includes at least the CBG 1, and includes one or two of a CBG 0, a CBG 2, or a CBG 3. Descriptions are provided below by using an example in which the to-be-sent code data includes the CBG 0, the CBG 1, and the CBG 2. The CBG 1 is retransmitted data, and a quantity and sizes of CBs included in the CBG 1 are respectively the same as a quantity and sizes of CBs included in the CBG 1 sent last time. The CBG 0 and the CBG 2 are initially transmitted data, and the CBG 0 and the CBG 2 form an initially transmitted transport block. In addition, if the first implementation method described in the implementation method 2 is used, a quantity and sizes of CBs included in the CBG 0 are respectively the same as a quantity and sizes of CBs included in the CBG 0 sent last time, and a quantity and sizes of CBs included in the CBG 2 are respectively the same as a quantity and sizes of CBs included in the CBG 2 sent last time. In addition, if the second implementation method described in the implementation method 2 is used, a quantity and sizes of CBs included in the CBG 0 may be respectively the same as or different from a quantity and sizes of CBs included in the CBG 0 sent last time, and a quantity and sizes of CBs included in the CBG 2 may be respectively the same as or different from a quantity and sizes of CBs included in the CBG 2 sent last time.

In the implementation method 2, when the foregoing implementation method A is used for the data type indication, the data type indication is a bitmap, and the bitmap is shown in FIG. 5. Bit locations corresponding to the CBG 0, the CBG 1, and the CBG 2 in the bitmap are 1, and are used to indicate that location information of the at least one piece of sent code data is respectively the CBG 0, the CBG 1, and the CBG 2, and a total of three CBGs are sent. Bit information corresponding to the initially transmitted data (namely, the CBG 0 and the CBG 2) and bit information corresponding to the retransmitted data (namely, the CBG 1) are 1. The bit locations corresponding to the CBG 2, the CBG 4, the CBG 5, the CBG 6, and the CBG 7 in the bitmap are 0, and are used to indicate that there is no code data sent in the CBG 2, the CBG 4, the CBG 5, the CBG 6, and the CBG 7. After receiving the bitmap, the second device may learn of that a total of three CBGs are sent this time: the CBG 0, the CBG 1, and the CBG 2. Then, the second device may determine, based on the feedback information (used to indicate that the transmission error occurs in the CBG 1) sent last time, that the received CBG 0 and CBG 2 are the initially transmitted data, and the received CBG 1 is the retransmitted data. In the implementation method 2, when the foregoing implementation method B is used for the data type indication, the data type indication is a bitmap, and the bitmap is shown in FIG. 7. A bit location corresponding to the CBG 1 in the bitmap is 1, and is used to indicate that location information of the at least one piece of sent retransmitted data is the CBG 1. Indication information is used to indicate that there are two pieces of initially transmitted data in the at least one piece of sent code data. To be specific, a total of three CBGs are sent. Bit locations corresponding to the CBG 0, the CBG 2, the CBG 3, the CBG 4, the CBG 5, the CBG 6, and the CBG 7 in the bitmap are 0, and are used to indicate that there is no retransmitted data sent in the CBG 0, the CBG 2, the CBG 3, CBG 4, the CBG 5, the CBG 6, and the CBG 7. After receiving the bitmap, the second device may learn of that the retransmitted data sent this time is the CBG 1, and determine, based on the bitmap and the indication information, that the initially transmitted data is the CBG 0 and the CBG 2.

In addition, the principle for allocating the physical layer resources between the CBG 0, the CBG 1, and the CBG 2 may be determined based on a case in which these CBGs belong to the same transport block. For example, a preset quantity of bits are first allocated, according to a principle of equal division as much as possible, to CBs included in the equivalent transport block including the CBG 0, the CBG 1, and the CBG 2. For example, the equivalent transport block including the CBG 0, the CBG 1, and the CBG 2 includes 10 CBs in total, if the preset quantity of bits is 1000 bits, 100 bits are allocated to each CB. A CB-to-bit matching process is also referred to as rate matching. Then, the preset quantity of bits are mapped to a physical resource for sending. It should be noted that during specific implementation, the CBs may be sequentially matched to the preset quantity of bits according to a sorting order of the CBs included in the equivalent transport block including the CBG 0, the CBG 1, and the CBG 2. For a specific example, refer to the description of the foregoing implementation 1.

If the foregoing implementation method 3 is used, code data sent next time includes at least the CBG 1 and at least four CBGs in the CBG 0, the CBG 2, the CBG 3, the CBG 4, the CBG 5, the CBG 6, or the CBG 7. Descriptions are provided below by using an example in which the sent code data includes the CBG 0, the CBG 1, the CBG 2, the CBG 3, and the CBG 4. The CBG 1 is retransmitted data, and a quantity and sizes of CBs included in the CBG 1 are respectively the same as a quantity and sizes of CBs included in the CBG 1 sent last time. The CBG 0, the CBG 2, the CBG 3, and the CBG 4 are initially transmitted data, and the CBG 0, the CBG 2, the CBG 3, and the CBG 4 form an initially transmitted transport block. A quantity and sizes of CBs included in the CBG 0 may be respectively the same as or different from a quantity and sizes of CBs included in the CBG 0 sent last time, a quantity and sizes of CBs included in the CBG 2 may be respectively the same as or different from a quantity and sizes of CBs included in the CBG 2 sent last time, a quantity and sizes of CBs included in the CBG 3 may be respectively the same as or different from a quantity and sizes of CBs included in the CBG 3 sent last time, and a quantity and sizes of CBs included in the CBG 4 may be respectively the same as or different from a quantity and sizes of CBs included in the CBG 4 sent last time.

In the implementation method 3, when the foregoing implementation method A is used for the data type indication, the data type indication is a bitmap, and the bitmap is shown in FIG. 6. Bit locations corresponding to the CBG 0, the CBG 1, the CBG 2, the CBG 3, and the CBG 4 in the bitmap are 1, and are used to indicate that location information of the at least one piece of sent code data is respectively the CBG 0, the CBG 1, the CBG 2, the CBG 3, and the CBG 4, and a total of five CBGs are sent. Bit information corresponding to the initially transmitted data (namely, the CBG 0, the CBG 2, the CBG 3, and the CBG 4) and bit information corresponding to the retransmitted data (namely, the CBG 1) are 1. Bit locations corresponding to the CBG 4, the CBG 6, and the CBG 7 in the bitmap are 0, and are used to indicate that there is no code data sent in the CBG 4, the CBG 6, and the CBG 7. After receiving the bitmap, the second device may learn of that a total of five CBGs are sent this time: the CBG 0, the CBG 1, the CBG 2, the CBG 3, and the CBG 4. Then, the second device may determine, based on the feedback information (used to indicate that the transmission error occurs in the CBG 1) sent last time, that the received CBG 0, CBG 2, CBG 3, and CBG 4 are the initially transmitted data, and the received CBG 1 is the retransmitted data. In the implementation method 3, when the foregoing implementation method B is used for the data type indication, the data type indication is a bitmap, and the bitmap is shown in FIG. 7. A bit location corresponding to the CBG 1 in the bitmap is 1, and is used to indicate that location information of the at least one piece of sent retransmitted data is the CBG 1. Indication information is used to indicate that there are four pieces of initially transmitted data in the at least one piece of sent code data. To be specific, a total of five CBGs are sent. Bit locations corresponding to the CBG 0, the CBG 2, the CBG 3, the CBG 4, the CBG 4, the CBG 6, and the CBG 7 in the bitmap are 0, and are used to indicate that there is no retransmitted data sent in the CBG 0, the CBG 2, the CBG 3, the CBG 4, the CBG 4, the CBG 6, and the CBG 7. After receiving the bitmap, the second device may learn of that the retransmitted data sent this time is the CBG 1, and determine, based on the bitmap and the indication information, that the initially transmitted data is the CBG 0, the CBG 2, CBG 3, and CBG 4.

In addition, the principle for allocating the physical layer resources between the CBG 0, the CBG 1, the CBG 2, the CBG 3, and the CBG 4 may be determined based on a case in which these CBGs belong to the same transport block. For example, a preset quantity of bits are first allocated, according to a principle of equal division as much as possible, to CBs included in the equivalent transport block including the CBG 0, the CBG 1, the CBG 2, the CBG 3, and the CBG 4. For example, the equivalent transport block including the CBG 0, the CBG 1, the CBG 2, the CBG 3, and the CBG 4 includes 10 CBs in total, if the preset quantity of bits is 1000 bits, 100 bits are allocated to each CB. A CB-to-bit matching process is also referred to as rate matching. Then, the preset quantity of bits are mapped to a physical resource for sending. It should be noted that during specific implementation, the CBs may be sequentially matched to the preset quantity of bits according to a sorting order of the CBs included in the equivalent transport block including the CBG 0, CBG 1, the CBG 2, CBG 3, and the CBG 4. For a specific example, refer to the description of the foregoing implementation 1.

Case 2: The at least one piece of code data includes only the initially transmitted data.

In this case, the first device may send only the initially transmitted data to the second device during one time of resource scheduling. For example, when code data is transmitted for the first time (that is, initially transmitted), the at least one piece of code data obtained by the first device is the initially transmitted data. For another example, when code data transmitted last time is correctly transmitted, retransmitted data is not included in next transmission. Therefore, the at least one piece of code data that is obtained by the first device and that is to be transmitted to the second device is also the initially transmitted data.

In this case, the scheduling type indication is used to indicate that the at least one piece of code data includes only the initially transmitted data.

In this case, in an implementation method, the data type indication is a bitmap, the bitmap includes N bits, N is pre-configured or predefined, or is notified by signaling, N is used to indicate a maximum quantity of code blocks or code block groups included in a transport block, N is an integer greater than 1, and the bitmap is used to indicate location information and/or an amount of the at least one piece of code data.

The bitmap indicates the location information and/or the amount of the at least one piece of code data (namely, the initially transmitted data) in sent code data. The second device determines, based on the scheduling type indication, that only the initially transmitted data is received this time, and then determines the location information and/or the amount of the received initially transmitted data based on the bitmap, so that the second device can obtain the initially transmitted data.

Case 3: The at least one piece of code data includes only the retransmitted data.

In this case, the first device may send only the retransmitted data to the second device during one time of resource scheduling. For example, when a transmission error occurs in a part or all of code data transmitted last time, the first device may receive feedback information, to indicate the code data in which the transmission error occurs, and in next transmission may retransmit the code data in which the transmission error occurs. In addition, no new transport block needs to be sent or no remaining physical resource is available for sending the new transport block. In this case, only the retransmitted data is sent in next transmission, that is, only the code data in which the transmission error occurs in the last time is sent.

In this case, the scheduling type indication is used to indicate that the at least one piece of code data includes only the retransmitted data.

In this case, in an implementation method, the data type indication is a bitmap, the bitmap includes N bits, N is pre-configured or predefined, or is notified by signaling, N is used to indicate a maximum quantity of code blocks or code block groups included in a transport block, N is an integer greater than 1, and the bitmap is used to indicate location information and/or an amount of the at least one piece of code data.

The bitmap indicates the location information and/or the amount of the at least one piece of code data (namely, the retransmitted data) in sent code data. The second device determines, based on the scheduling type indication, that only the retransmitted data is received this time, and then determines the location information and/or the amount of the received retransmitted data based on the bitmap, so that the second device can obtain the retransmitted data.

In an implementation method, after the first device sends the at least one piece of code data to the second device, the second device may send feedback information to the first device, to indicate a transmission status of the at least one piece of code data, where the transmission status is that transmission succeeds or a transmission error occurs. Optionally, when the data type indication is a bitmap, the feedback information may also be a bitmap of a same size. The example shown in FIG. 4A is used as an example. If the first device sends the CBG 0 to the CBG 3 to the second device, the second device may notify, by using the bitmap, the first device of which CBGs in the CBG 0 to the CBG 3 are successfully transmitted and which CBG has a transmission error. FIG. 8 is a diagram of an example of feedback information. In the example shown in FIG. 8, bits corresponding to the CBG 1, the CBG 2, and the CBG 3 are 1, and indicate that the CBG 1, the CBG 2, and the CBG 3 are successfully transmitted; and a bit corresponding to the CBG 0 is 0, and indicate that the transmission error occurs in the CBG 0. Because the first device does not transmit the CBG 4 to the CBG 7, bits corresponding to the CBG 4 to the CBG 7 in the bitmap may be set to 1, set to 0, or not set. For example, in FIG. 8, bits corresponding to the CBG 4 to the CBG 7 in the bitmap are set to 1.

Figure 9:
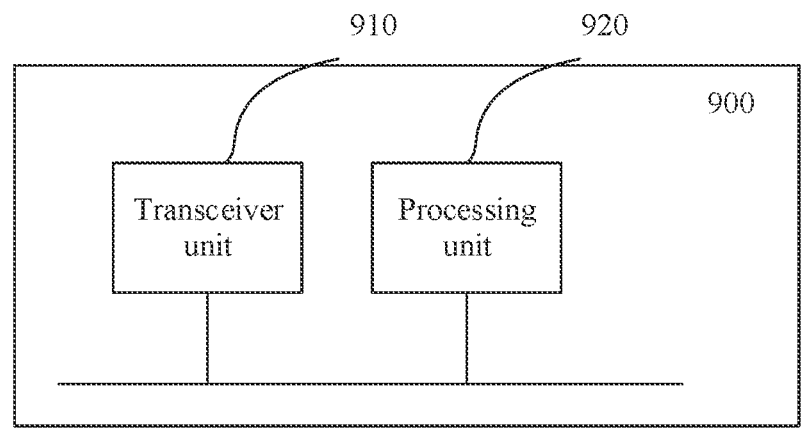
FIG. 9 is a schematic diagram of a communication apparatus according to an embodiment of this application.

FIG. 9 is a schematic diagram of a communication apparatus according to an embodiment of this application. The communication apparatus 900 is configured to implement steps corresponding to the first device or the second device in the foregoing embodiments. As shown in FIG. 9, the communication apparatus 900 includes a transceiver unit 910 and a processing unit 920.

In a first embodiment, the communication apparatus 900 is configured to implement steps corresponding to the first device in the foregoing embodiments.

The processing unit 920 is configured to obtain at least one piece of code data. The transceiver unit 910 is configured to: send a scheduling type indication and a data type indication to a second device, where the scheduling type indication is used to indicate that the at least one piece of code data includes initially transmitted data, retransmitted data, or initially transmitted data and retransmitted data, and the data type indication is used to indicate location information and/or an amount of a part or all of the at least one piece of code data; and send the at least one piece of code data to the second device.

In a possible implementation method, the at least one piece of code data includes at least one code block group, and the data type indication is used to indicate location information and/or a quantity of a part or all of the at least one code block group.

In a possible implementation method, the at least one piece of code data includes at least one piece of transport block data and at least one piece of code block data, the at least one piece of transport block data is initially transmitted data, the at least one piece of code block data is retransmitted data, and the scheduling type indication is used to indicate that the at least one piece of code data includes the initially transmitted data and the retransmitted data.

In a possible implementation method, the data type indication is a bitmap, the bitmap includes N bits, N is preconfigured or predefined, or is notified by using signaling, N is used to indicate a maximum quantity of code block groups included in a transport block, N is an integer greater than 1, and the bitmap is used to indicate location information and/or an amount of the at least one piece of code data.

In a possible implementation method, the data type indication is a bitmap, the bitmap includes N bits, N is preconfigured or predefined, or is notified by using signaling, N is used to indicate a maximum quantity of code block groups included in a transport block, N is an integer greater than 1, and the bitmap is used to indicate location information and/or an amount of the at least one piece of code block data. The transceiver unit 910 is further configured to send indication information to the second device, where the indication information is used to indicate location information and/or an amount of the at least one piece of transport block data, and the amount of the at least one piece of transport block data is a quantity of code block groups in the at least one piece of transport block data.

In a possible implementation method, a quantity, location information, and sizes of code block groups included in the at least one piece of code block data are correspondingly the same as a quantity, location information, and sizes of code block groups included in the at least one piece of code block data during initial transmission.

In a possible implementation method, location information and a size of a code block group included in the at least one piece of transport block data are the same as location information and a size of a code block group included in code data that is successfully transmitted in code data transmitted last time; or location information and a size of a code block group included in the at least one piece of transport block data are the same as location information and a size of a code block group included in a part of code data that is successfully transmitted last time.

In a possible implementation method, the processing unit 920 is further configured to: determine, based on a physical resource used for the at least one piece of code data and a modulation and coding scheme, the sizes and the quantity of code block groups included in the at least one piece of transport block data.

In a possible implementation method, the at least one piece of code data includes at least one piece of transport block data, the at least one piece of transport block data is initially transmitted data, and the scheduling type indication is used to indicate that the at least one piece of code data includes the initially transmitted data; or the at least one piece of code data includes at least one piece of code block data, the at least one piece of code block data is retransmitted data, and the scheduling type indication is used to indicate that the at least one piece of code data includes the retransmitted data.

In a possible implementation method, that the transceiver unit 910 sends the at least one piece of code data to the second device specifically includes: The transceiver unit maps the at least one piece of code data to a first physical resource, and sends the at least one piece of code data to the second device, where a mapping manner in which a code block or a code block group included in the at least one piece of code data is mapped to the first physical resource meets a predefined transport block mapping rule.

In a second embodiment, the communication apparatus 900 is configured to implement steps corresponding to the second device in the foregoing embodiments.

The transceiver unit 910 is configured to: receive at least one piece of code data from a first device; and receive a scheduling type indication and a data type indication from the first device, where the scheduling type indication is used to indicate that the at least one piece of code data includes initially transmitted data, retransmitted data, or initially transmitted data and retransmitted data; and the data type indication is used to indicate location information and/or an amount of a part or all of the at least one piece of code data. The processing unit 920 is configured to obtain the at least one piece of code data based on the scheduling type indication and the data type indication.

In a possible implementation method, the at least one piece of code data includes at least one code block group, and the data type indication is used to indicate location information and/or a quantity of a part or all of the at least one code block group.

In a possible implementation method, the at least one piece of code data includes at least one piece of transport block data and at least one piece of code block data, the at least one piece of transport block data is initially transmitted data, the at least one piece of code block data is retransmitted data, and the scheduling type indication is used to indicate that the at least one piece of code data includes the initially transmitted data and the retransmitted data. That the processing unit 920 obtains the at least one piece of code data based on the scheduling type indication and the data type indication specifically includes: The processing unit obtains the at least one piece of transport block data and the at least one piece of code block data respectively based on the scheduling type indication and the data type indication.

In a possible implementation method, the data type indication is a bitmap, the bitmap includes N bits, N is preconfigured or predefined, or is notified by using signaling, N is used to indicate a maximum quantity of code block groups included in a transport block, N is an integer greater than 1, and the bitmap is used to indicate location information and/or an amount of the at least one piece of code data.

In a possible implementation method, the data type indication is a bitmap, the bitmap includes N bits, N is preconfigured or predefined, or is notified by using signaling, N is used to indicate a maximum quantity of code block groups included in a transport block, N is an integer greater than 1, and the bitmap is used to indicate location information and/or an amount of the at least one piece of code block data. The transceiver unit 910 is further configured to receive indication information from the first device, where the indication information is used to indicate location information and/or an amount of the at least one piece of transport block data, and the amount of the at least one piece of transport block data is a quantity of code block groups in the at least one piece of transport block data. That the processing unit 920 obtains the at least one piece of transport block data and the at least one piece of code block data respectively based on the scheduling type indication and the data type indication specifically includes: The processing unit separately obtains the at least one piece of transport block data and the at least one piece of code block data based on the scheduling type indication, the data type indication, and the indication information.

In a possible implementation method, a quantity, location information, and sizes of code block groups included in the at least one piece of code block data are correspondingly the same as a quantity, location information, and sizes of code block groups included in the at least one piece of code block data during initial transmission.

In a possible implementation method, location information and a size of a code block group included in the at least one piece of transport block data are the same as location information and a size of a code block group included in code data that is successfully transmitted in code data transmitted last time; or location information and a size of a code block group included in the at least one piece of transport block data are the same as location information and a size of a code block group included in a part of code data that is successfully transmitted last time.

In a possible implementation method, the processing unit 920 is further configured to: determine, based on a physical resource used for the at least one piece of code data and a modulation and coding scheme, the sizes and the quantity of code block groups included in the at least one piece of transport block data.

In a possible implementation method, the at least one piece of code data includes at least one piece of transport block data, the at least one piece of transport block data is initially transmitted data, and the scheduling type indication is used to indicate that the at least one piece of code data includes the initially transmitted data; or the at least one piece of code data includes at least one piece of code block data, the at least one piece of code block data is retransmitted data, and the scheduling type indication is used to indicate that the at least one piece of code data includes the retransmitted data.

In a possible implementation method, that the transceiver unit 910 receives at least one piece of code data from a first device specifically includes: The transceiver unit receives, from the first device, the at least one piece of code data that is mapped to a first physical resource, where a mapping manner in which a code block or a code block group included in the at least one piece of code data is mapped to the first physical resource meets a predefined transport block mapping rule.

Optionally, the communication apparatus may further include a storage unit. The storage unit is configured to store data or instructions (which may also be referred to as code or programs). The foregoing units may interact with or be coupled to the storage unit, to implement a corresponding method or function. For example, the processing unit 920 may read the data or the instructions in the storage unit, so that the communication apparatus implements the methods in the foregoing embodiments.

It should be understood that division into the units in the communication apparatus is merely logical function division. In an actual implementation, all or some of the units may be integrated into one physical entity, or may be physically separated. In addition, all the units in the communication apparatus may be implemented in a form of software invoked by a processing element, or may be implemented in a form of hardware; or some units may be implemented in a form of software invoked by a processing element, and some units may be implemented in a form of hardware. For example, each unit may be a separately disposed processing element, or may be integrated into a chip of the communication apparatus for implementation. In addition, each unit may alternatively be stored in a memory in a form of a program to be invoked by a processing element of the communication apparatus to perform a function of the unit. In addition, the units may be all or partially integrated, or may be implemented independently. The processing element herein may also be referred to as a processor, and may be an integrated circuit having a signal processing capability. During implementation, steps in the foregoing methods or the foregoing units may be implemented by using a hardware integrated logic circuit in a processor element, or may be implemented in the form of software invoked by the processing element.

For example, the unit in any one of the foregoing communication apparatuses may be one or more integrated circuits configured to implement the foregoing methods, for example, one or more application-specific integrated circuits (ASICs), one or more microprocessors (e.g., digital signal processors (DSPs)), one or more field-programmable gate arrays (FPGAs), or a combination of at least two of the integrated circuit forms. For another example, when the units in the communication apparatus may be implemented in a form of scheduling a program by a processing element, the processing element may be a general-purpose processor, for example, a central processing unit (CPU) or another processor that can invoke the program. For still another example, the units may be integrated and implemented in a form of a system-on-a-chip (SOC).

Figure 10:
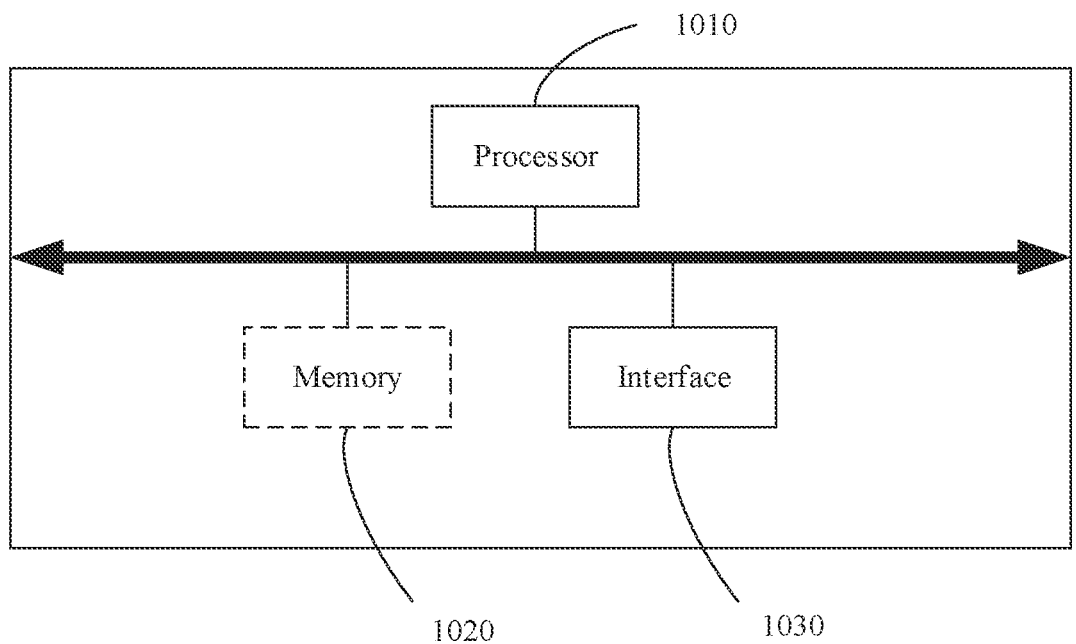
FIG. 10 is a schematic diagram of another communication apparatus according to an embodiment of this application.

FIG. 10 is a schematic diagram of a communication apparatus according to an embodiment of this application. The communication apparatus is configured to implement operations of the first device or the second device in the foregoing embodiments. As shown in FIG. 10, the communication apparatus includes at least one processor 1010 and an interface 1030. Optionally, the communication apparatus further includes a memory 1020. The interface 1030 is configured to communicate with another device. Optionally, the communication apparatus may be a chip system or an integrated circuit in a first device or a second device.

The method performed by the first device or the second device in the foregoing embodiments may be implemented by the processor 1010 by invoking a program stored in a memory (which may be the memory 1020 in the first device or the second device, or may be an external memory). That is, the first device or the second device may include the processor 1010, and the processor 1010 invokes the program in the memory, to perform the method performed by the first device or the second device in the foregoing method embodiments. The processor herein may be an integrated circuit having a signal processing capability, for example, a CPU. The first device or the second device may be implemented by using one or more integrated circuits configured to implement the foregoing method, for example, one or more ASICs, one or more microprocessors DSPs, one or more FPGAs, or a combination of at least two of the integrated circuit forms. Alternatively, the foregoing implementations may be combined.

Specifically, functions/implementation processes of the transceiver unit 910 and the processing unit 920 in FIG. 9 may be implemented by the processor 1010 in the communication apparatus 1000 shown in FIG. 10 by invoking computer-executable instructions stored in the memory 1020. Alternatively, functions/implementation processes of the processing unit 920 in FIG. 9 may be implemented by the processor 1010 in the communication apparatus 1000 shown in FIG. 10 by invoking computer-executable instructions stored in the memory 1020, and functions/implementation processes of the transceiver unit 910 in FIG. 9 may be implemented by using the interface 1030 in the communication apparatus 1000 shown in FIG. 10, for example, the function/implementation process of the transceiver unit 910, may be implemented by the processor by invoking program instructions in the memory to drive the interface 1030.

An embodiment of this application further provides a terminal. The terminal may be a transportation vehicle or an intelligent device, and the transportation vehicle or the intelligent device includes at least one of the first device, the second device, or the communication apparatus 1000. For example, the terminal may be a smart home device, an intelligent wearable device, an unmanned aerial vehicle, an unmanned transport vehicle, a vehicle, a robot, or the like.

An embodiment of this application further provides a communication system. The communication system includes the first device in any one of the foregoing embodiments and the second device in any one of the foregoing embodiments.

An embodiment of this application further provides a chip, including at least one processor and an interface. The interface is configured to provide program instructions or data for the at least one processor. The at least one processor is configured to execute the program instructions, to implement the method in any one of the foregoing embodiments.

Figure 11:
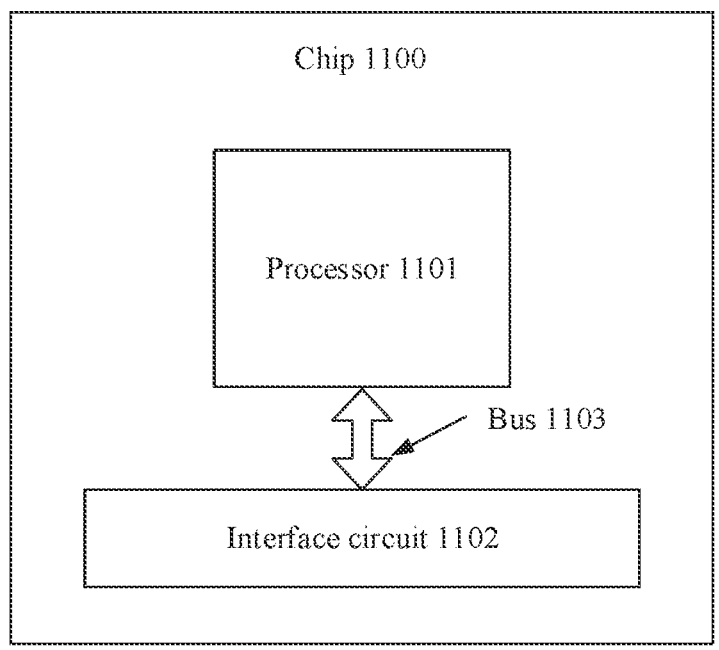
FIG. 11 is a schematic diagram of a structure of a chip according to an embodiment of this application.

FIG. 11 is a schematic diagram of a structure of a chip according to an embodiment of this application. The chip 1100 includes one or more processors 1101 and an interface circuit 1102. Optionally, the chip 1100 may further include a bus 1103.

The processor 1101 may be an integrated circuit chip and has a signal processing capability. In an implementation process, the steps of the foregoing methods may be completed by using a hardware integrated logic circuit in the processor 1101, or by using instructions in a form of software. The processor 1101 may be a general-purpose processor, a DSP, an ASIC, an FPGA or another programmable logic device, a discrete gate or transistor logic device, or a discrete hardware component. The processor may implement or perform the methods and steps that are disclosed in embodiments of this application. The general-purpose processor may be a microprocessor, or the processor may be any conventional processor or the like.

The interface circuit 1102 may be used to send or receive data, instructions, or information. The processor 1101 may process the data, the instructions, or other information received through the interface circuit 1102, and may send processed information through the interface circuit 1102.

Optionally, the chip further includes a memory. The memory may include a read-only memory and a random access memory, and provide operation instructions and data for the processor. A part of the memory may further include a non-volatile random access memory (NVRAM).

Optionally, the memory stores an executable software module or a data structure, and the processor may perform a corresponding operation by invoking operation instructions (the operation instructions may be stored in an operating system) stored in the memory.

Optionally, the chip may be used in the communication apparatus (including the primary node and the secondary node) in embodiments of this application. Optionally, the interface circuit 1102 may be configured to output an execution result of the processor 1101. For the short-distance communication method provided in one or more embodiments of this application, refer to the foregoing embodiments. Details are not described herein again.

It should be noted that functions corresponding to each of the processor 1101 and the interface circuit 1102 may be implemented by using a hardware design, or may be implemented by using a software design, or may be implemented by using a combination of software and hardware. This is not limited herein.

A person of ordinary skill in the art may understand that various numbers such as "first" and "second" in this application are merely used for differentiation for ease of description, and are not used to limit the scope of embodiments of this application or represent a sequence. The term "and/or" describes an association between associated objects and indicates that three relationships may exist. For example, A and/or B may indicate the following three cases: Only A exists, both A and B exist, and only B exists. The character "/" generally indicates an "or" relationship between associated objects. "At least one" means one or more. "At least two" means two or more. "At least one", "any one", or a similar expression thereof indicates any combination of the items, and includes a singular item (piece) or any combination of plural items (pieces). For example, at least one of a, b, or c may indicate: a, b, c, a and b, a and c, b and c, or a, b, and c, where a, b, and c may be singular or plural. The term "a plurality of" means two or more, and another quantifier is similar to this.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of the present disclosure.

It may be clearly understood by a person skilled in the art that, for convenient and brief description, for a detailed working process of the foregoing system, apparatus, and unit, refer to a corresponding process in the foregoing method embodiments. Details are not described herein again.

All or some of the foregoing embodiments may be implemented by software, hardware, firmware, or any combination thereof. When software is used to implement the foregoing embodiments, all or some of embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or other programmable apparatuses. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk (SSD))), or the like.

The various illustrative logical units and circuits in embodiments of this application may implement or operate the functions via a general-purpose processor, a digital signal processor, an ASIC, a FPGA or another programmable logical apparatus, a discrete gate or transistor logic, a discrete hardware component, or a design of any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in embodiments of this application may be directly embedded into hardware, a software unit executed by a processor, or a combination thereof. The software unit may be stored in a random-access memory (RAM), a flash memory, a read-only memory (ROM), an erasable programmable ROM (EPROM), an electrically EPROM (EEPROM), a register, a hard disk, a removable magnetic disk, a compact disc ROM (CD-ROM), or a storage medium of any other form in the art. For example, the storage medium may connect to a processor, so that the processor may read information from the storage medium and write information to the storage medium. Alternatively, the storage medium may be integrated into a processor. The processor and the storage medium may be disposed in the ASIC.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In one or more examples of designs, the functions described in this application may be implemented by using hardware, software, firmware, or any combination thereof. If embodiments of the present disclosure are implemented by software, these functions may be stored in a computer-readable medium or are transmitted to the computer-readable medium in a form of one or more instructions or code. The computer-readable medium is either a computer storage medium or a communication medium that enables a computer program to move from one place to another. The storage medium may be an available medium that may be accessed by any general-purpose or dedicated computer. For example, such a computer-readable medium may include but is not limited to a RAM, a ROM, an EEPROM, a CD-ROM, or another optical disc storage, a disk storage or another magnetic storage apparatus, or any other medium that may be used to bear or store program code, where the program code is in a form of an instruction or a data structure or in a form that can be read by a general or special computer or a general or special processor. In addition, any connection may be appropriately defined as a computer-readable medium. For example, if software is transmitted from a website, a server, or another remote resource by using a coaxial cable, an optical fiber computer, a twisted pair, a DSL or in a wireless manner, such as infrared, radio, or microwave, the software is included in a defined computer-readable medium. The disk and the disc include a compact disc, a laser disc, an optical disc, a digital versatile disc (DVD), a floppy disk, and a Blu-ray disc. The disc usually copies data in a magnetic manner, and the disk usually optically copies data in a laser manner. The foregoing combination may also be included in the computer-readable medium.

A person skilled in the art should be aware that in the foregoing one or more examples, functions described in this application may be implemented by hardware, software, firmware, or any combination thereof. When software is used to implement the functions, the functions may be stored in a computer-readable medium or transmitted as one or more instructions or code in a computer-readable medium. The computer-readable medium includes a computer storage medium and a communication medium, where the communication medium includes any medium that enables a computer program to be transmitted from one place to another. The storage medium may be any available medium accessible to a general-purpose or a dedicated computer.

In the foregoing specific implementations, the objectives, technical solutions, and beneficial effects of this application are further described in detail. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application. According to the foregoing descriptions of this specification in this application, technologies in the art may use or implement the content of this application. Any modification based on the disclosed content shall be considered obvious in the art. The basic principles described in this application may be applied to other variations without departing from the essence and scope of this application. Therefore, the content disclosed in this application is not limited to the described embodiments and designs but may also be extended to a maximum scope that is consistent with the principles and disclosed new features of this application.

Although this application is described with reference to specific features and embodiments thereof, it is clear that various modifications and combinations may be made to them without departing from the spirit and scope of this application. Correspondingly, the specification and accompanying drawings are merely example description of this application defined by the accompanying claims, and are considered as any of or all modifications, variations, combinations or equivalents that cover the scope of this application. It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A communication method implemented by a first device, the communication method comprising:
   obtaining at least one piece of code data;
   sending, to a second device, a scheduling type indication and a data type indication, wherein the scheduling type indication indicates that the at least one piece of code data comprises initially transmitted data, retransmitted data, or both the initially transmitted data and the retransmitted data, wherein the scheduling type indication comprises L bits, wherein L is a positive integer, wherein some bit statuses of the L bits indicate at least one of redundancy version information or a coding mode of a channel bit sequence, and wherein the data type indication indicates one or more of first location information of at least a part of the at least one piece of code data or an amount of the at least the part of the at least one piece of code data; and
   sending, to the second device, the at least one piece of code data.

2. The communication method of claim 1, wherein the at least one piece of code data comprises at least one code block group, and wherein the data type indication indicates one or more of a location of at least a part of the at least one code block group or a quantity of the at least the part of the at least one code block group.

3. The communication method of claim 2, wherein the data type indication is a bitmap that comprises N bits and indicates the one or more of the location or the quantity, wherein N is pre-configured, predefined, or based on signaling, and wherein N is an integer greater than one and indicates a maximum quantity of code block groups comprised in a transport block.

4. The communication method of claim 1, wherein the data type indication is a bitmap that comprises N bits and that indicates the one or more of the first location information or the amount, wherein N is pre-configured, predefined, or based on signaling, and wherein N is an integer greater than one and indicates a maximum quantity of code block groups comprised in a transport block.

5. The communication method of claim 4, further comprising determining, based on a physical resource and a modulation and coding scheme for the at least one piece of code data, sizes and a quantity of code block groups comprised in at least one piece of transport block data.

6. The communication method of claim 1, wherein the at least one piece of code data comprises at least one piece of transport block data and at least one piece of code block data, wherein the at least one piece of transport block data is the initially transmitted data, wherein the at least one piece of code block data is the retransmitted data, and wherein the scheduling type indication indicates that the at least one piece of code data comprises the initially transmitted data and the retransmitted data.

7. The communication method of claim 6, wherein a first quantity, the first location information, and first sizes of code block groups comprised in the retransmitted data are respectively the same as a second quantity, second location information, and second sizes of code block groups comprised in an initially transmitted at least one piece of code block data.

8. The communication method of claim 6, wherein the first location information and a first size of a first code block group comprised in the retransmitted data are respectively the same as second location information and a second size of a second code block group comprised in at least a part of successfully and previously transmitted code data.

9. The communication method of claim 1, wherein the at least one piece of code data comprises at least one piece of transport block data that is the initially transmitted data and the scheduling type indication indicates that the at least one piece of code data comprises the initially transmitted data, or wherein the at least one piece of code data comprises at least one piece of code block data that is the retransmitted data and the scheduling type indication indicates that the at least one piece of code data comprises the retransmitted data.

10. The communication method of claim 1, wherein the coding mode is one of at least three coding modes corresponding to different manners for generating the channel bit sequence.

11. The communication method of claim 1, wherein the coding mode is one of a coding mode 1, a coding mode 2, or a coding mode 3, wherein the redundancy version information comprises a redundancy version number, and wherein a bit status of of the L bits indicates at least one of:
    transport block-based initial transmission;
    transport block-based retransmission and determining the channel bit sequence corresponding to a redundancy version 1 using the coding mode 1 or the coding mode 2;
    the transport block-based retransmission and determining the channel bit sequence corresponding to the redundancy version 1 using the coding mode 3;
    code block group-based retransmission and determining the channel bit sequence corresponding to the redundancy version 1 using the coding mode 3;
    the code block group-based retransmission and determining the channel bit sequence corresponding to the redundancy version 1 using the coding mode 1 or the coding mode 2;
    the code block group-based retransmission and a redundancy version 2;
    the code block group-based retransmission and a redundancy version 3; or
    code block group-based hybrid transmission of initial transmission and retransmission and determining the channel bit sequence corresponding to the redundancy version 1 using the coding mode 3.

12. A communication method implemented by a second device, the communication method comprising:
    receiving at least one piece of code data from a first device;
    receiving a scheduling type indication and a data type indication from the first device, wherein the scheduling type indication indicates that the at least one piece of code data comprises initially transmitted data, retransmitted data, or both the initially transmitted data and the retransmitted data, wherein the scheduling type indication comprises L bits, wherein L is a positive integer, wherein some bit statuses of the L bits indicate at least one of redundancy version information or a coding mode of a channel bit sequence, and wherein the data type indication indicates one or more of first location information of at least a part of the at least one piece of code data or an amount of the at least the part of the at least one piece of code data; and obtaining the at least one piece of code data based on the scheduling type indication and the data type indication.

13. The communication method of claim 12, wherein the at least one piece of code data comprises at least one code block group, and wherein the data type indication indicates one or more of a location of at least a part of the at least one code block group or a quantity of the at least the part of the at least one code block group.

14. The communication method of claim 13, wherein the data type indication is a bitmap that comprises N bits and indicates the one or more of the location or the quantity, wherein N is pre-configured, predefined, or based on signaling, and wherein N is an integer greater than one and indicates a maximum quantity of code block groups comprised in a transport block.

15. The communication method of claim 12, wherein the data type indication is a bitmap that comprises N bits and indicates the one or more of the first location information or the amount, wherein N is pre-configured, predefined, or based on signaling, and wherein N is an integer greater than one and indicates a maximum quantity of code block groups comprised in a transport block.

16. The communication method of claim 12, wherein the at least one piece of code data comprises at least one piece of transport block data and at least one piece of code block data, wherein the at least one piece of transport block data is the initially transmitted data, wherein the at least one piece of code block data is the retransmitted data, and wherein the scheduling type indication indicates that the at least one piece of code data comprises the initially transmitted data and the retransmitted data.

17. The communication method of claim 16, wherein a first quantity, the first location information, and first sizes of first code block groups comprised in the retransmitted data are respectively the same as a second quantity, second location information, and second sizes of second code block groups comprised in at least one piece of initially transmitted code block data.

18. The communication method of claim 16, wherein the first location information and a first size of a first code block group comprised in the initially transmitted data are respectively the same as second location information and a second size of a second code block group comprised in at least a part of previously and successfully transmitted code data.

19. A first device, comprising:
a memory configured to store instructions; and
one or more processors coupled to the memory and configured to execute the instructions to cause the first device to:
obtain at least one piece of code data;
send, to a second device, a scheduling type indication and a data type indication, wherein the scheduling type indication indicates that the at least one piece of code data comprises initially transmitted data, retransmitted data, or both the initially transmitted data and the retransmitted data, wherein the scheduling type indication comprises L bits, wherein L is a positive integer, wherein some bit statuses of the L bits indicate at least one of redundancy version information or a coding mode of a channel bit sequence, and wherein the data type indication indicates one or more of location information of at least a part of the at least one piece of code data or an amount of the at least the part of the at least one piece of code data; and
send, to the second device, the at least one piece of code data.

20. The first device of claim 19, wherein the at least one piece of code data comprises at least one code block group, and wherein the data type indication indicates one or more of a location of at least a part of the at least one code block group or a quantity of the at least the part of the at least one code block group.

* * * * *